(12) United States Patent
Niwa et al.

(10) Patent No.: US 9,602,039 B2
(45) Date of Patent: Mar. 21, 2017

(54) PWM RECTIFIER FOR MOTOR DRIVE CONNECTED TO ELECTRIC STORAGE DEVICE

(71) Applicant: FANUC CORPORATION, Yamanashi (JP)

(72) Inventors: Masakazu Niwa, Yamanashi (JP); Kenta Yamamoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/821,895

(22) Filed: Aug. 10, 2015

(65) Prior Publication Data

US 2016/0049895 A1 Feb. 18, 2016

(30) Foreign Application Priority Data

Aug. 12, 2014 (JP) .................................. 2014-164340

(51) Int. Cl.
*H02P 1/00* (2006.01)
*H02P 27/08* (2006.01)

(52) U.S. Cl.
CPC ................................... *H02P 27/08* (2013.01)

(58) Field of Classification Search
USPC ................. 318/400.21, 400.3, 438, 503, 504; 320/104; 363/37
See application file for complete search history.

(56) References Cited

U.S. PATENT DOCUMENTS

| | | | | |
|---|---|---|---|---|
| 2004/0021441 | A1* | 2/2004 | Komiyama | ............... B60K 6/34 320/104 |
| 2004/0232865 | A1* | 11/2004 | Suzuki | .................... H02P 21/22 318/400.21 |

(Continued)

FOREIGN PATENT DOCUMENTS

| | | |
|---|---|---|
| CN | 101404473 A | 4/2009 |
| DE | 102014005198 A1 | 10/2014 |

(Continued)

OTHER PUBLICATIONS

English Abstract and Machine Translation for German Publication No. 10 2014 005 198 A1, published Oct. 16, 2014, 19 pgs.

(Continued)

*Primary Examiner* — Eduardo Colon Santana
*Assistant Examiner* — Cortez Cook
(74) *Attorney, Agent, or Firm* — Fredrikson & Byron, P.A.

(57) ABSTRACT

A PWM rectifier includes a main circuit unit which performs a power conversion on the basis of a PWM control signal, a DC voltage loop control unit which generates a current command, a current command restriction unit which sets, when an absolute value of the current command exceeds a limit value, the limit value as a final current command, and otherwise sets the current command as the final current command, a DC voltage loop saturation determination unit which determines a saturation state when the final current command is set to the limit value and otherwise determines as a non-saturation state, a DC voltage command calculation unit which changes the DC voltage command into a value obtained by adding an offset to a minimum or maximum value of the DC voltage value, and a PWM control signal generation unit which generates the PWM control signal from the final current command.

8 Claims, 12 Drawing Sheets

(56) References Cited

U.S. PATENT DOCUMENTS

| | | | |
|---|---|---|---|
| 2009/0140680 A1* | 6/2009 | Park | H02P 23/26 318/438 |
| 2012/0049774 A1* | 3/2012 | Takamatsu | B60L 11/1803 318/400.3 |
| 2014/0306640 A1* | 10/2014 | Yamamoto | H02P 27/08 318/504 |

FOREIGN PATENT DOCUMENTS

| | | |
|---|---|---|
| JP | 2000236679 A | 8/2000 |
| JP | 2009136058 A | 6/2009 |
| JP | 2010260094 A | 11/2010 |
| JP | 201285512 A | 4/2012 |
| JP | 2013070565 A | 4/2013 |

OTHER PUBLICATIONS

English Abstract for Chinese Publication No. 101404473 A, published Apr. 8, 2009, 1 pg.
English Abstract for Japanese Publication No. 2000236679 A, published Aug. 29, 2000, 2 pgs.
English Abstract for Japanese Publication No. 2012085512 A, published Apr. 26, 2012, 2 pgs.
English Abstract for Japanese Publication No. 2010260094 A, published Nov. 18, 2010, 2 pgs.
English Translation of Abstract for Japanese Publication No. 2013070565, published Apr. 18, 2013, 1 page.
English Translation of Abstract for Japanese Publication No. 2009136058, published Jun. 18, 2009, 1 page.

* cited by examiner

PWM RECTIFIER FOR MOTOR DRIVE CONNECTED TO ELECTRIC STORAGE DEVICE

BACKGROUND OF THE INVENTION

Field of the Invention

The present invention relates to a PWM rectifier for a motor drive, which controls a switching element using a PWM signal to convert three-phase AC power into DC power, and in particular relates to a PWM rectifier connected, through an electric storage device which can store DC power, to the DC side of an inverter which performs a power conversion between DC power and AC power being drive power or regenerative power of a motor.

Description of the Related Art

In a motor drive unit for driving motors used in machine tools, industrial machines, forming machines, injection molding machines, or various kinds of robots, DC power temporarily converted from AC power which is input from an AC power supply side is further converted to AC power. The converted AC power is used as drive power of a motor provided for each drive axis. The motor drive unit includes: a rectifier for outputting DC power by rectifying AC power supplied from an AC power supply side provided with a commercial three-phase AC power supply; and an inverter, being connected to a DC link at a DC side of the rectifier, for performing a bidirectional power conversion between DC power at the DC link and AC power being drive power or regenerative power of a motor. The motor drive unit controls the speed, torque, or position of a rotor of the motor connected to the AC side of the inverter.

In an acceleration or deceleration control of a motor with a motor drive unit, an output or regeneration with large amount of AC power is required to an AC power supply, which leads an occurrence of an electric power peak. Then, the power supply capacity on an AC power supply side from which power is supplied to the motor drive unit is generally designed taking the electric power peak which occurs at the time of acceleration and deceleration of the motor into consideration. However, according to the design in consideration of the electric power peak which occurs at the time of the acceleration and deceleration of the motor, a power supply capacity is inevitably large compared to a case in a simple design in consideration of the average power of a motor drive unit. Especially in a motor drive unit with many opportunities of quick accelerations and quick decelerations of a motor, a power supply capacity is much larger. An installation cost and operation cost increase as a power supply capacity becomes larger, and therefore it is preferable to reduce the power supply capacity.

In order to reduce a power supply capacity, a motor drive unit may be provided with a PWM (Pulse Width Modulation) rectifier which can perform a power running operation (conversion operation) converting AC power into DC power and a regenerative operation (inverse-conversion operation) inverting DC power into AC power, and an electric storage device which is connected in parallel with a DC side of the PWM rectifier and can store DC power. With this configuration, by adequately controlling the PWM rectifier to adjust an amount of each power conversion in a power running operation (conversion operation) converting AC power into DC power and a regenerative operation (inverse-conversion operation) inverting DC power into AC power performed by the PWM rectifier, it is possible to store regenerative power generated by a motor at the time of deceleration of the motor in an electric storage device, and to reuse the stored power at the time of acceleration of the motor, thereby reducing a power supply capacity.

FIG. 10 is a diagram illustrating a configuration of a common motor drive unit which includes a PWM rectifier. Hereinafter, one to which the same reference numeral is given in different drawings is a component having the same function. A motor drive unit 100 includes a PWM rectifier 10 which converts AC power from a commercial three-phase AC power supply (hereinafter, simply referred to as "AC power supply" in some cases) 4 into DC power, and an inverter 2 which converts the DC power output from the PWM rectifier 10 into the AC power with a desired frequency to be supplied as drive power of a motor 3, and which converts the AC power regenerated by the motor 3 into DC power. The motor drive unit 100 controls the motor 3 to adjust the speed, torque, or the position of a rotor of the motor 3 connected to the AC side of the inverter 2. The PWM rectifier 10 is connected to an AC reactor 5 on a three phase AC input side.

The inverters 2 are provided, the number of which is the same as the number of the motors 3, in order to individually supply the drive power to the respective motors 3 each provided for corresponding one of a plurality of drive axes to perform a drive control of the motors 3. Note that in the depicted example, it is assumed that the number of the motor 3 is one, and therefore the number of inverter 2 is also one in this case. In many cases, one PWM rectifier 10 is provided with respect to a plurality of inverters 2 for the purpose of reducing the cost and the occupancy space of the motor drive unit 100.

The PWM rectifier 10 is configured by a main circuit unit 11 including a bridge circuit formed with a switching element and a diode connected to the switching element in antiparallel, and a PWM rectifier control unit 12 which generates a PWM control signal for controlling a switching operation of the switching element in the main circuit unit 11. Although regeneration power occurs by the motor 3 when decelerating the motor 3 by a control of the motor drive unit 100, such regeneration power can be returned to the PWM rectifier 10 through the inverter 2. The PWM rectifier 10 can perform a regeneration operation (inverse-conversion operation), in which DC power is converted into AC power, with the control of the switching operation of the switching element in the PWM rectifier 10 by the PWM control signal, and can return the regenerative energy returned from the inverter 2 to the AC power supply 4 side.

The PWM rectifier control unit 12 in the PWM rectifier 10 generates the PWM control signal from an AC voltage value on the AC power supply 4 side detected by an AC voltage detection unit 21, an AC current value on the AC power supply 4 side detected by an AC current detection unit 22, and a DC voltage value at an electric storage device 6 detected by a DC voltage detection unit 23 (a DC voltage value across a DC link between the main circuit unit 11 in the PWM rectifier 10 and the inverter 2). The PWM control signal is generated so that the main circuit unit 11 of the PWM rectifier 10 generates the AC power with a power factor 1 and maintains the DC voltage value which is an output of the PWM rectifier 10 at a desired value. The PWM control signal is applied to the switching element in the main circuit unit 11 of the PWM rectifier 10.

FIG. 11 is a block diagram for describing a configuration of the PWM rectifier control unit illustrated in FIG. 10. The PWM rectifier control unit 12 includes a DC voltage loop control unit 31, a power supply phase calculation unit 32, a three-phase DQ conversion unit 33, a current loop control unit 34, a DQ three-phase conversion unit 35, and a PWM modulation unit 36.

On the basis of the DC voltage value detected by the DC voltage detection unit 23 and a DC voltage command which is input, the DC voltage loop control unit 31 generates a current command which causes the DC voltage value to match the DC voltage command. Note that a fixed value is generally used as the DC voltage command in the PWM rectifier 10. A power supply phase is calculated by the power supply phase calculation unit 32 from the AC voltage value detected by the AC voltage detection unit 21. By using the power supply phase, the three-phase DQ conversion unit 33 converts the three-phase AC current value detected by the AC current detection unit 22 into a current value on a DQ coordinate plane (hereinafter, referred to as "DQ phase current value"). The current loop control unit 34 generates a voltage command on the DQ coordinate plane (hereinafter, referred to as "DQ phase voltage command") which causes the DQ phase current value to match the current command. The DQ three-phase conversion unit 35 converts the DQ phase voltage command into a three-phase voltage command using the power supply phase. The PWM modulation unit 36 compares the three-phase voltage command with a triangular-wave carrier signal having a predetermined carrier frequency to generate the PWM control signal for controlling a switching operation of a semiconductor switching element in the main circuit unit 11 of the PWM rectifier 10. According to such configuration, in the main circuit unit 11 of the PWM rectifier 10, the switching operation of the internal switching element is controlled by the PWM control signal to perform the power running or regenerative operation.

FIG. 12 is a block diagram for describing a configuration of the DC voltage loop control unit illustrated in FIG. 11. The DC voltage loop control unit 31 includes a subtractor 41, a PI control unit 42, and a current command restriction unit 43. In general, an upper limit value is provided for an absolute value of the current command generated by the DC voltage loop control unit 31 on the basis of a rating current of an element such as a switching element in the PWM rectifier 11. The current command restriction unit 43 clamps the current command at the upper limit value when a magnitude of the current command is equal to or greater than the upper limit value. In addition, when it is desired to reduce a power supply capacity, for example, a limit value of the current command in the current command restriction unit 43 may be set to be an even lower value based on the power supply capacity. Hereinafter, a state in which the current command has reached the limit value is referred to as a "saturation state of the DC voltage loop control unit". Since the current command is held at at the limit value when the DC voltage loop control unit is in the saturation state, DC power with constant amplitude is always output from the PWM rectifier 10 and it is difficult to cause the DC voltage to follow the DC voltage command. Therefore, the DC voltage value decreases when the PWM rectifier 10 is in a power running state, and the DC voltage value increases when the rectifier is in a regenerative state.

The proportional-integral control (PI control) is performed on a difference between the DC voltage command and the DC voltage value, which is calculated by the subtractor 41, by the PI control unit 42 to generate the current command. When the magnitude of the current command is equal to or greater than the upper limit value, the current command restriction unit 43 clamps the current command at the upper limit value.

With the motor drive unit 100 including the above-mentioned PWM rectifier 10, the DC voltage command of the PWM rectifier 10 is lowered in advance when the motor 3 is in power running, so that the regenerative energy generated at the time of deceleration of the motor 3 is stored in the electric storage device 6 without returning the energy to the AC power supply side to use the energy at the next power running of the motor 3, whereby improving efficiency and reducing the power supply capacity.

For example, there is a method which suppresses a peak of AC power supplied from an AC power supply by controlling a current of a PWM rectifier under a predetermined current limit value as described in the Japanese Laid-open Patent Publication No. 2000-236679.

FIG. 13 is a timing chart schematically illustrating an operation of a motor drive unit described in the Japanese Laid-open Patent Publication No. 2000-236679. In this example, according to the method described in the Japanese Laid-open Patent Publication No. 2000-236679, a case is described in which the motor drive unit 100 illustrated in FIG. 10 to FIG. 12 is operated to cause the motor 3 to stop, accelerate, run at a constant speed, decelerate, and stop in this order. Note that FIG. 13 illustrates a "motor speed", a "motor output", a "rectifier output", and "DC voltage command and DC voltage value" from the top. In addition, a dashed line illustrates the DC voltage command.

First, during a motor stop condition from time t0 to time t1, the PWM rectifier control unit 12 of the PWM rectifier 10 controls the DC voltage value of the electric storage device 6 to match the DC voltage command.

When staring acceleration of the motor 3 at time t1, entire energy required for the acceleration of the motor 3 is supplied from the AC power supply 4 side through the PWM rectifier 10 until the time t2. After that, when the energy required for the acceleration of the motor 3 reaches a limit value at time t2, it is less satisfied only with the energy supplied from the AC power supply 4 side through the PWM rectifier 10, and therefore, at time t2, the energy supply from the electric storage device 6 to the motor 3 is started. Therefore, the DC voltage value (electric potential of the electric storage device 6) decreases from time t2 to time t3. The limit value is set to such a value that the output of the PWM rectifier 10 is a value less than a motor maximum output.

When the motor 3 stops the acceleration and operates at a constant speed at time t3, the energy required for driving the motor 3 is less than the energy output from the PWM rectifier 10, and therefore from time t3, the DC voltage value (electric potential of the electric storage device 6) turns to increase. Then, the DC voltage value returns to the value of the DC voltage command at time t4. From time t4 to time t5, the DC voltage value follows the DC current command and keeps constant, and the motor drive unit becomes in a condition in which entire energy required for the operation of the motor 3 at the constant speed is supplied from the AC power supply 4 side through the PWM rectifier 10.

When the motor 3 starts deceleration at time t5, the regenerative energy is returned to the inverter 2 from the motor 3. The inverter 2 inverts the regenerative energy into DC power to return the DC power to the DC link side. Although the PWM rectifier 10 also performs a regenerative operation at this time, the absolute value of the DC power resulting from the regenerative energy is greater than the absolute value of the limit value for the output of the PWM rectifier 10, and the DC power is therefore stored in the electric storage device 6, which results in an increase of the DC voltage value (electric potential of the electric storage device 6). When the absolute value of the regenerative power from the motor 3 is smaller than the absolute value of the limit value for the output of the PWM rectifier 10 at time t6, the DC voltage value (electric potential of the electric storage device 6) decreases from time t6 to time t7.

Even when the motor 3 stops at time t7, the DC voltage value (electric potential of the electric storage device 6) has not reached the value of the DC voltage command, and therefore, the PWM rectifier 10 returns the energy to the AC power supply 4 side until the DC voltage value (electric potential of the electric storage device 6) reaches the value of the DC voltage command. Then, the DC voltage value returns to the value of the DC voltage command at time 8. After the time t8, the PWM rectifier 10 controls the DC voltage value to match the DC voltage command.

In addition, for example, there is a method which suppresses AC power supplied from an AC power supply by gradually decreasing a DC voltage command at the time of acceleration of a motor and gradually increasing the DC voltage command at the time of deceleration of the motor, so that the regenerative energy of the motor is stored in an electric storage device, as described in the Japanese Laid-open Patent Publication No. 2012-085512.

In addition, for example, there is a method which suppresses AC power supplied from an AC power supply by setting the optimal DC voltage command for each operation pattern of a motor, so that the regenerative energy of the motor is stored in an electric storage device, as described in the Japanese Laid-open Patent Publication No. 2010-260094.

FIG. 14 is a timing chart schematically illustrating an operation of the motor drive unit described in the Japanese Laid-open Patent Publication No. 2012-085512 and the Japanese Laid-open Patent Publication No. 2010-260094. In this example, according to the method described in the Japanese Laid-open Patent Publication No. 2012-085512 or and Japanese Laid-open Patent Publication No. 2010-260094, a case is described in which the motor drive unit 100 illustrated in FIG. 10 to FIG. 12 is operated to cause the motor 3 to stop, accelerate, run at a constant speed, decelerate, and stop in this order. Note that FIG. 14 illustrates a "motor speed", a "motor output", a "rectifier output", and "DC voltage command and DC voltage value" from the top. In addition, a dashed line illustrates the DC voltage command.

In an operation pattern in which the motor 3 is stopped from time t0 to time t1, is accelerated from time t1 to time t3, is operated at a constant speed from time t3 to time t4, is decelerated from time t4 to time t5, and is stopped from time t5 to time t7, a case will be described in which the DC voltage command is set as illustrated in the drawing so that the regenerative energy of the motor 3 is stored in the electric storage device, for one example. Specifically, the energy stored in the electric storage device 6 is made to discharge to supply the energy to the motor 3 by decreasing the DC voltage command of the PWM rectifier 10 at the time of acceleration of the motor 3. The regenerative energy generated by the motor 3 is made to be stored in the electric storage device 6 without returning the energy to the power supply by increasing the DC voltage command of the PWM rectifier 10 at the time of deceleration of the motor 3.

First, during a motor stop condition from time t0 to time t1, the PWM rectifier control unit 12 of the PWM rectifier 10 controls the DC voltage value of the electric storage device 6 to match the DC command.

When starting acceleration of the motor 3 at time t1, entire energy required for the acceleration of the motor 3 is supplied from the AC power supply 4 side through the PWM rectifier 10 until the time t2. After that, when the energy required for the acceleration of the motor 3 reaches a limit value at time t2, it is less satisfied only with the energy supplied from the AC power supply 4 side through the PWM rectifier 10, and therefore, at time t2, the PWM rectifier 10 is controlled to decrease the DC voltage command, so that the energy is also supplied from the electric storage device 6 to the motor 3. Therefore, the DC voltage value (electric potential of the electric storage device 6) decreases according to the decrease of the DC voltage command from time t2 to time t3.

When the motor 3 stops the acceleration and operates at a constant speed at time t3, the energy required for driving the motor 3 is less than the energy output from the PWM rectifier 10. In the illustrated example, in order to effectively utilize the energy stored in the electric storage device 6, the DC voltage command is reduced at a smaller ratio than a case of the motor deceleration from time t2 to time t3, so that the energy supply from the electric storage device 6 to the motor 3 is continued. Therefore, from time t3 to time t4, the energy required for the operation of the motor 3 at the constant speed is sufficiently supplied by the energy supplied from the AC power supply 4 side through the PWM rectifier 10 and the energy from the electric storage device 6.

When the motor 3 starts deceleration at time t4, the regenerative energy is returned to the inverter 2 from the motor 3. The inverter 2 inverts the regenerative energy into DC power to return the DC power to the DC link side. At this time, by controlling a power conversion operation of the PWM rectifier 10 to be stopped and the DC voltage command to be increased, the DC power resulting from the regenerative energy is stored in the electric storage device 6. Therefore, from time t4 to time t5, the DC power is stored in the electric storage device 6, so that the DC voltage value (electric potential of the electric storage device 6) increases.

When the motor 3 stops at time t5, the PWM rectifier 10 controls the DC voltage value to match the DC voltage command kept constant. Since the energy stored in the electric storage device 6 is consumed by an internal resistance of the PWM rectifier 10 or the like, the PWM rectifier 10 controls the DC voltage value to match the DC voltage command, so that the AC power from the AC power supply 4 side is converted into DC power to supply the energy sufficient for compensating the consumption.

When addressing the electric power peak which occurs at the time of accelerating or decelerating the motor as described above, the power supply capacity on AC power supply side tends to become large.

According to the invention described in the Japanese Laid-open Patent Publication No. 2000-236679, providing an upper limit for the output of a PWM rectifier enables a suppression of the peak of the energy supplied from the PWM rectifier. However, from a fact that the DC voltage command is always constant, the PWM rectifier continues to supply the energy from the AC power supply side to the DC link even after finishing the acceleration of a motor. Therefore, an electric storage device is charged to the condition before the motor acceleration, and whereby the regenerative energy generated at the time of motor deceleration cannot be stored in the electric storage device. Accordingly, the regenerative energy is required to return to the AC power supply side or to be consumed by an electric discharge resistor (not illustrated) in a DC link. In this way, according to the invention described in the Japanese Laid-open Patent Publication No. 2000-236679, the regenerative power generated at the time of motor deceleration cannot be effectively reused in the subsequent timing of motor start, and the power supply capacity is reduced not much.

In addition, according to the invention described in the Japanese Laid-open Patent Publication No. 2012-085512 and the Japanese Laid-open Patent Publication No. 2010-260094, regenerative energy generated by a motor is stored in an electric storage device without returning the energy to a power supply by increasing a DC voltage command of a PWM rectifier at the time of motor deceleration, and the energy stored in the electric storage device is made to discharge to reuse for acceleration of the motor by decreasing the DC voltage command of the PWM rectifier at the time of motor acceleration. Thereby, the electric power peak which occurs in the motor acceleration and deceleration is suppressed, and the power supply capacity on the AC power supply side is reduced. However, the DC voltage command is required to be set by trial and error for each operation pattern of a motor, which is not practical.

SUMMARY OF THE INVENTION

In view of the above-mentioned problems, an object of the present invention is to provide a PWM rectifier for a motor drive which can suppress an electric power peak occurring at the time of acceleration and deceleration of a motor and reduce a power supply capacity on the AC power supply side.

In order to achieve the above-mentioned object, a PWM rectifier connected through an electric storage device capable of storing DC power to DC side of an inverter performing a power conversion between the DC power and AC power which is drive power or regenerative power of a motor, includes: a main circuit unit in which a switching operation of a switching element is PWM-controlled on the basis of a PWM control signal received, and which performs a power conversion between AC power on an AC power supply side and the DC power on the DC side; a DC voltage loop control unit which generates a current command to cause the DC voltage value on the DC side of the main circuit unit to match a DC voltage command received; a current command restriction unit which sets, when an absolute value of the current command exceeds a limit value predetermined, the limit value as a final current command, and otherwise sets the current command as the final current command; a DC voltage loop saturation determination unit which determines that the DC voltage loop control unit is in a saturation state when the current command restriction unit sets the limit value as the final current command and otherwise determines that the DC voltage loop control unit is in a non-saturation state; a DC voltage command calculation unit which maintains the DC voltage command when the DC voltage loop saturation determination unit determines the non-saturation state, and changes the DC voltage command into a value obtained by adding a predetermined offset to a minimum value or a maximum value of the DC voltage value after a transition to the saturation state from the non-saturation state when the DC voltage loop saturation determination unit determines the saturation state; and a PWM control signal generation unit which generates the PWM control signal using the final current command to output the PWM control signal to the main circuit unit.

The PWM rectifier includes an operation state determination unit which determines that the main circuit unit is in a power running state when the final current command is positive, and that the main circuit unit is in a regenerative state when the final current command is negative, wherein the DC voltage command calculation unit changes the DC voltage command into the value obtained by adding a predetermined positive offset to the minimum value of the DC voltage value after the transition to the saturation state from the non-saturation state when the DC voltage loop saturation determination unit determines the saturation state and the operation state determination unit determines the power running state.

The PWM rectifier includes: an operation state determination unit which determines that the main circuit unit is in a power running state when the final current command is positive, and that the main circuit unit is in a regenerative state when the final current command is negative; and a PWM operation stopping instruction unit which instructs a stop of the switching operation in the main circuit unit when the DC voltage loop saturation determination unit determines the saturation state and the operation state determination unit determines the regenerative state, wherein the DC voltage command calculation unit changes the DC voltage command into the value obtained by adding a predetermined negative offset to the maximum value of the DC voltage value after the transition to the saturation state from the non-saturation state when the DC voltage loop saturation determination unit determines the saturation state and the operation state determination unit determines the regenerative state.

Under a condition in which the DC voltage loop saturation determination unit determines the saturation state and the operation state determination unit determines the regenerative state, the PWM operation stopping instruction unit may cancel the stop of the switching operation in the main circuit unit when the DC voltage value exceeds a predetermined value.

The current command restriction unit may include a limit value change unit which changes the limit value into a larger limit value when the DC voltage value exceeds a first threshold value or falls below a second threshold value smaller than the first threshold value, and which sets the limit value back to the limit value before the change when the DC voltage value falls within a range between the first threshold value and the second threshold value after changing into the larger limit value.

The DC voltage command calculation unit may set the DC voltage command changed when the DC voltage loop saturation determination unit has determined the saturation state back to the DC voltage command before the change in response to an initialization command input from a host control device.

The DC voltage command before the change may be set as a value larger than a continuous rating value of components which constitute the PWM rectifier and smaller than a short-time rating value.

The DC voltage command calculation unit may include an extracting unit which extracts the minimum value and the maximum value of the DC voltage value after the transition to the saturation state from the non-saturation state.

BRIEF DESCRIPTION OF THE DRAWINGS

The present invention will be more clearly understood with reference to the accompanying drawings in which.

DETAILED DESCRIPTION

Figure 1:
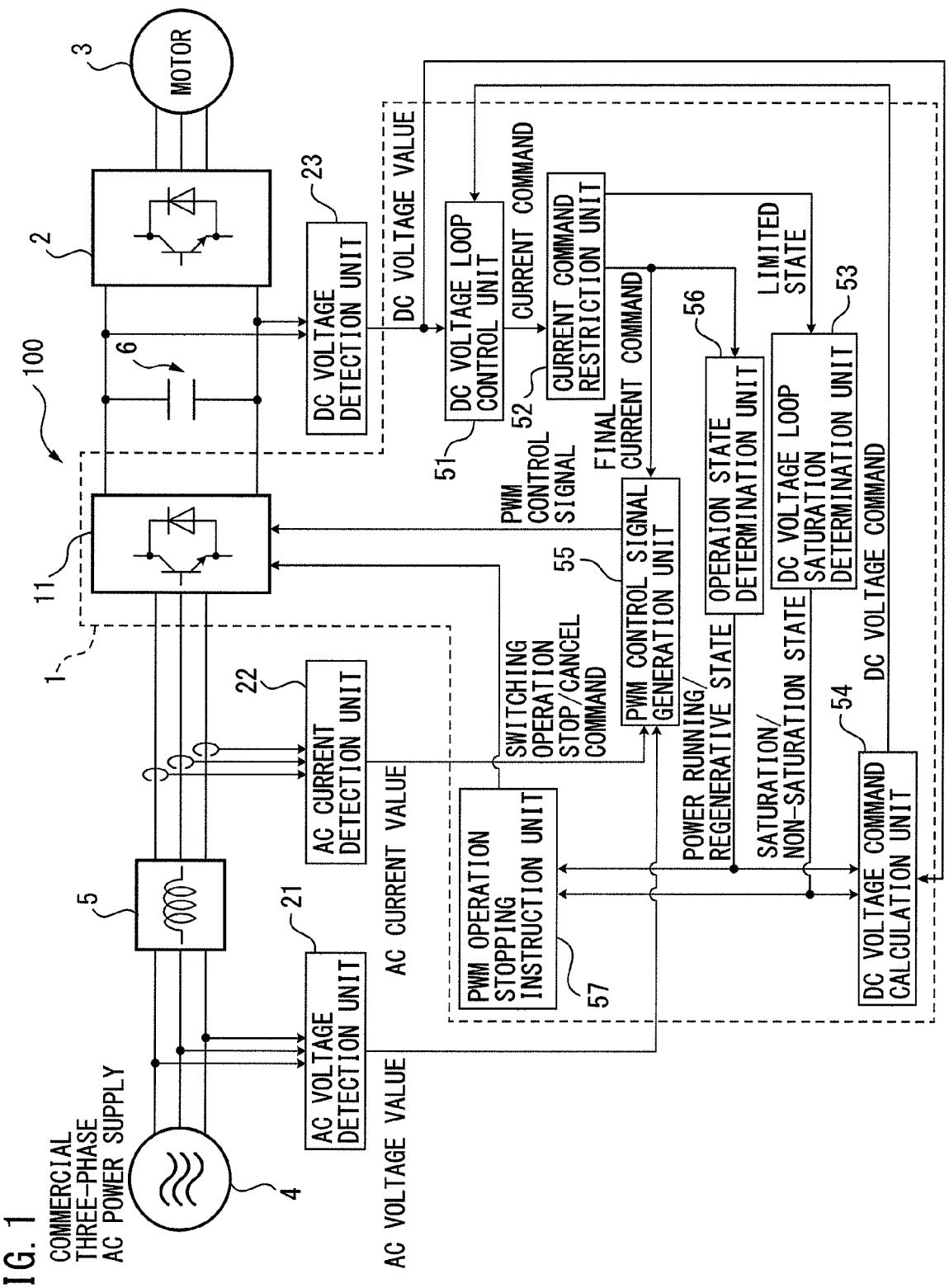
FIG. 1 is a principle block diagram of a PWM rectifier according to a first embodiment.

Hereinafter, a PWM rectifier for a motor drive connected to an electric storage device will be described with reference to drawings. However, it is to be understood that the present invention is not limited to the embodiments illustrated in the drawings or described below.

FIG. 1 is a principle block diagram of a PWM rectifier according to a first embodiment. A motor drive unit 100 is connected through an AC reactor 5 to a commercial three-phase AC power supply 4 on a three phase AC input side, and is connected to a three phase motor 3 on an AC output motor side. The motor drive unit 100 includes a PWM rectifier 1 according to the first embodiment, an electric storage device 6 provided in a DC link located on a DC side of the PWM rectifier 1, and an inverter 2 which is connected to the electric storage device 6 on the DC side, and is connected to the three phase motor 3 on the AC side.

Although each of the following embodiments, including the present embodiment, describes the motor drive unit 100 which performs a drive control for one motor 3, the number of motors 3 to which the drive control is performed does not particularly limit the present invention, but the present invention can also apply to a motor drive unit performing a drive control to a plurality of motors 3. The kind of motor 3 driven by the motor drive unit 100 does not particularly limit the present invention, but for example, an induction motor or a synchronous motor may be employed. The kind of inverter 2 also does not particularly limit the present invention, but any inverter can be employed as long as the inverter can perform a bidirectional power conversion between DC power at the DC link and AC power which is the drive power or regenerative power of the motor 3. For example, the inverter 2 is configured as a PWM inverter including a switching element therein, and converts the DC power supplied from the DC link side into three phase AC power with a desired voltage and a desired frequency, which is for causing the internal switching element to perform a switching operation on the basis of a motor driving command received from a host control device and driving the motor 3. This results in an operation of the motor 3 based on the supplied three phase AC power with a variable voltage and variable frequency. The regenerative power is generated at the time of braking the motor 3, and the AC power which is the regenerative power generated by the motor 3 is converted into DC power on the basis of the motor driving command received from the host control device, and is returned to the DC link.

The PWM rectifier 1 is connected, in the motor control device 100, to the DC side of the inverter 2 which performs the power conversion between the DC power and the AC power which is the drive power or regenerative power of the motor 3, through the electric storage device 6 which can store the DC power. The PWM rectifier 1 according to the first embodiment includes a main circuit unit 11, a DC voltage loop control unit 51, a current command restriction unit 52, a DC voltage loop saturation determination unit 53, a DC voltage command calculation unit 54, a PWM control signal generation unit 55, an operation state determination unit 56, and a PWM operation stopping instruction unit 57.

In the motor drive unit 100 which temporally converts the AC power input from the AC power supply side into the DC power and then further into the AC power to use the converted AC power as the drive power for the motor, the AC voltage value and the AC current value on the AC power supply side, and the DC voltage value at the DC link are used for the drive control of the motor 3. Therefore, the motor drive unit 100 is generally provided with an AC voltage detection unit 21, an AC current detection unit 22 and a DC voltage detection unit 23 which detect the values respectively. The PWM rectifier 1 according to the first embodiment uses, for the control, the AC voltage value detected by the AC voltage detection unit 21, the AC current value detected by the AC current detection unit 22, and the DC voltage value detected by the DC voltage detection unit 23 as described below.

The main circuit unit 11 includes a bridge circuit formed with a switching element and a diode connected to the switching element in antiparallel, and performs a power conversion between the AC power on the AC power supply 4 side and the DC power on the DC side by a PWM-control for a switching operation of the switching element on the basis of a PWM control signal received from the PWM control signal generation unit 55. In other words, on the basis of the received PWM control signal, either the power running operation (conversion operation) which converts the AC power into the DC power or the regenerative operation (inverse-conversion operation) which inverts the DC power into the AC power is performed. Examples of the switching element are an IGBT, a thyristor, a GTO (Gate Turn-OFF thyristor), a transistor and the like, but the kind of the switching element per se does not limit the present invention, and other semiconductor devices may be employed.

The DC voltage loop control unit 51 generates a current command which causes the DC voltage value on the DC side of the main circuit unit 11 detected by the DC voltage detection unit 23 to match the received DC voltage command.

When the absolute value of the current command exceeds a predetermined limit value, the current command restriction unit 52 sets the limit value as a final current command, and otherwise sets the current command as the final current command. The above-mentioned limit value used for the processing by the current command restriction unit 52 corresponds to a limit value for an output of the main circuit unit 11 in the PWM rectifier 1. The above-mentioned limit value used for the processing by the current command restriction unit 52 is set to such a value that the limit value for the output of the main circuit unit 11 is less than the maximum output of the motor 3. This limit value can limit the peak of the energy supplied from the PWM rectifier 1 (power supply). The details of an operation of the current command restriction unit 52 are described below.

The DC voltage loop saturation determination unit 53 determines that the DC voltage loop control unit 51 is in the saturation state when the current command restriction unit 52 sets the limit value as the final current command, and otherwise determines that the DC voltage loop control unit 51 is in the non-saturation state. The details of an operation of the DC voltage loop saturation determination unit 53 are described below.

The DC voltage command calculation unit 54 maintains the DC voltage command when the DC voltage loop saturation determination unit 53 determines that "the DC voltage loop control unit 51 is in the non-saturation state". The DC voltage command calculation unit 54 changes the DC voltage command into a value obtained by adding a predetermined offset to a minimum or maximum value of the DC voltage value after a transition to the saturation state from the non-saturation state when the DC voltage loop saturation determination unit 53 determines that "the DC voltage loop control unit 51 is in the saturation state". Note that the DC voltage command calculation unit 54 includes an extracting unit (not illustrated) which extracts the minimum value and the maximum value of the DC voltage value after the transition to the saturation state from the non-saturation state. The details of an operation of the DC voltage command calculation unit 54 are described below.

The PWM control signal generation unit 55 compares the final current command with a triangular-wave carrier signal having a predetermined carrier frequency, and generates the PWM control signal for controlling the switching operation of the switching element in the main circuit unit 11 of the PWM rectifier 1 to output the PWM control signal to the main circuit unit 11. The PWM control signal is generated so that the main circuit unit 11 of the PWM rectifier 1 generates the AC power with the power factor 1 and maintains the DC voltage value which is an output of the PWM rectifier 1 at a desired value. The PWM control signal is applied to the switching element in the main circuit unit 11 of the PWM rectifier 1. According to such operation, the main circuit unit 11 performs, on the basis of the received PWM control signal, either the power running operation (conversion operation) which converts the AC power into the DC power or the regenerative operation (inverse-conversion operation) which inverts the DC power into the AC power.

Figure 11:
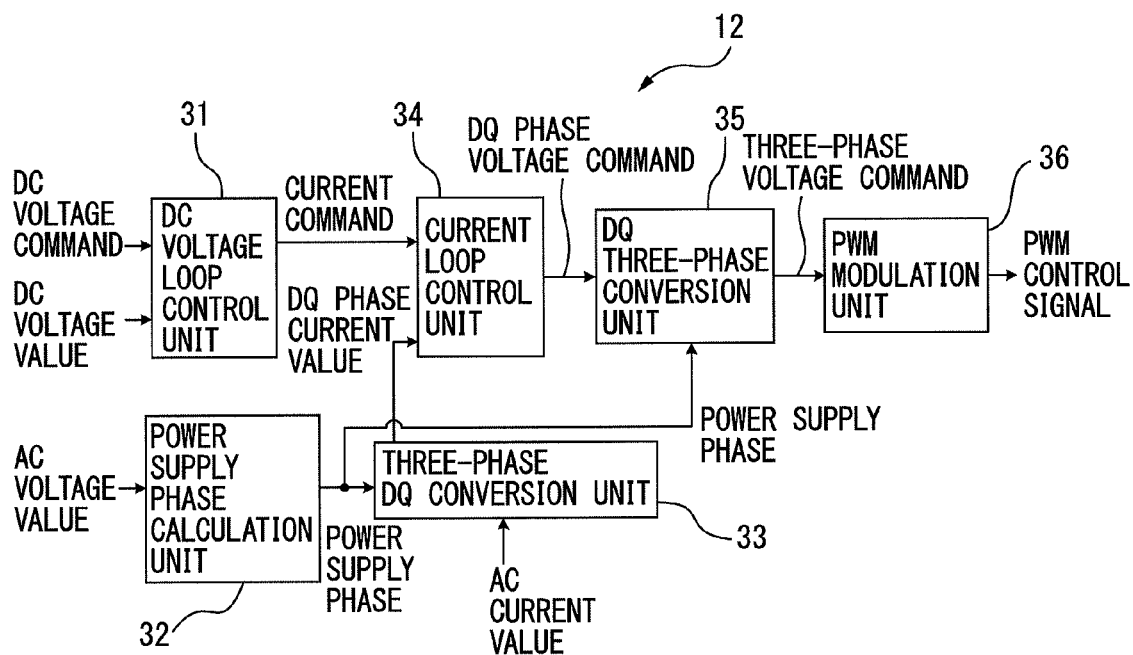
FIG. 11 is a block diagram for describing a configuration of the PWM rectifier control unit illustrated in FIG. 10.
Figure 12:
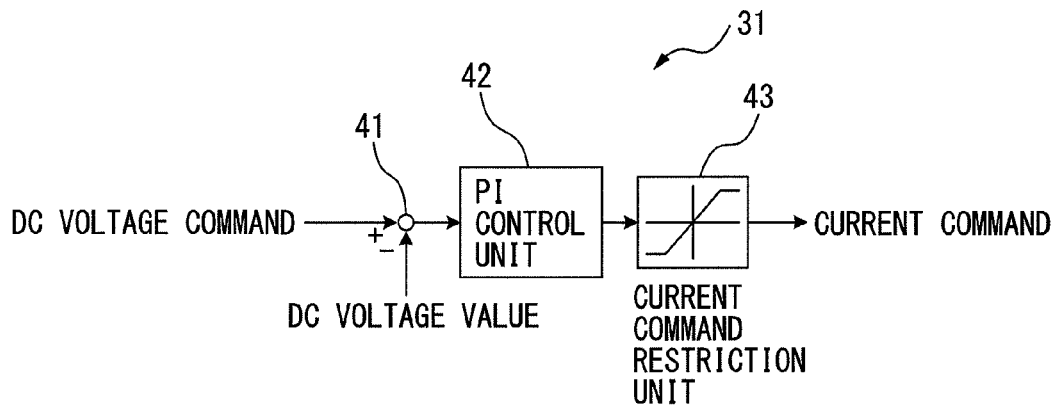
FIG. 12 is a block diagram for describing a configuration of the DC voltage loop control unit illustrated in FIG. 11.
Figure 13:
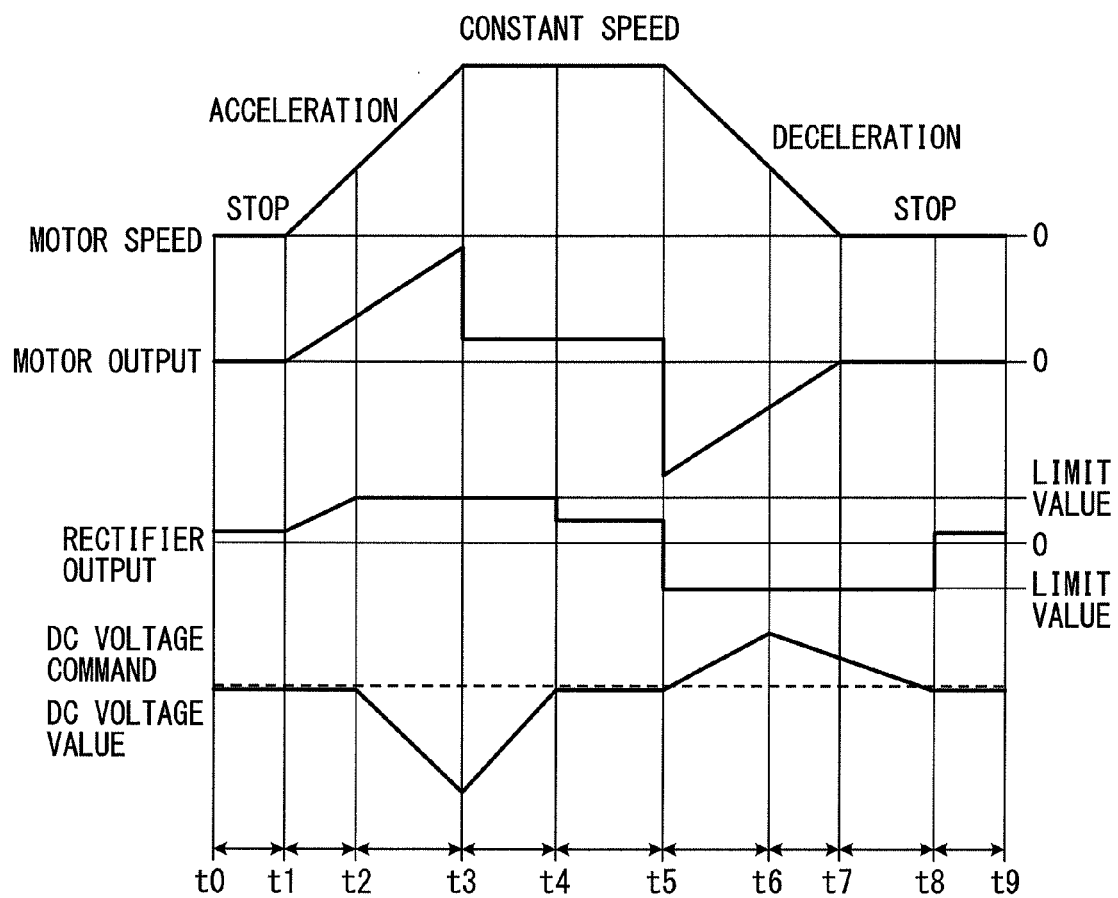
FIG. 13 is a timing chart schematically illustrating an operation of the motor drive unit described in the Japanese Laid-open Patent Publication No. 2000-236679.
Figure 14:
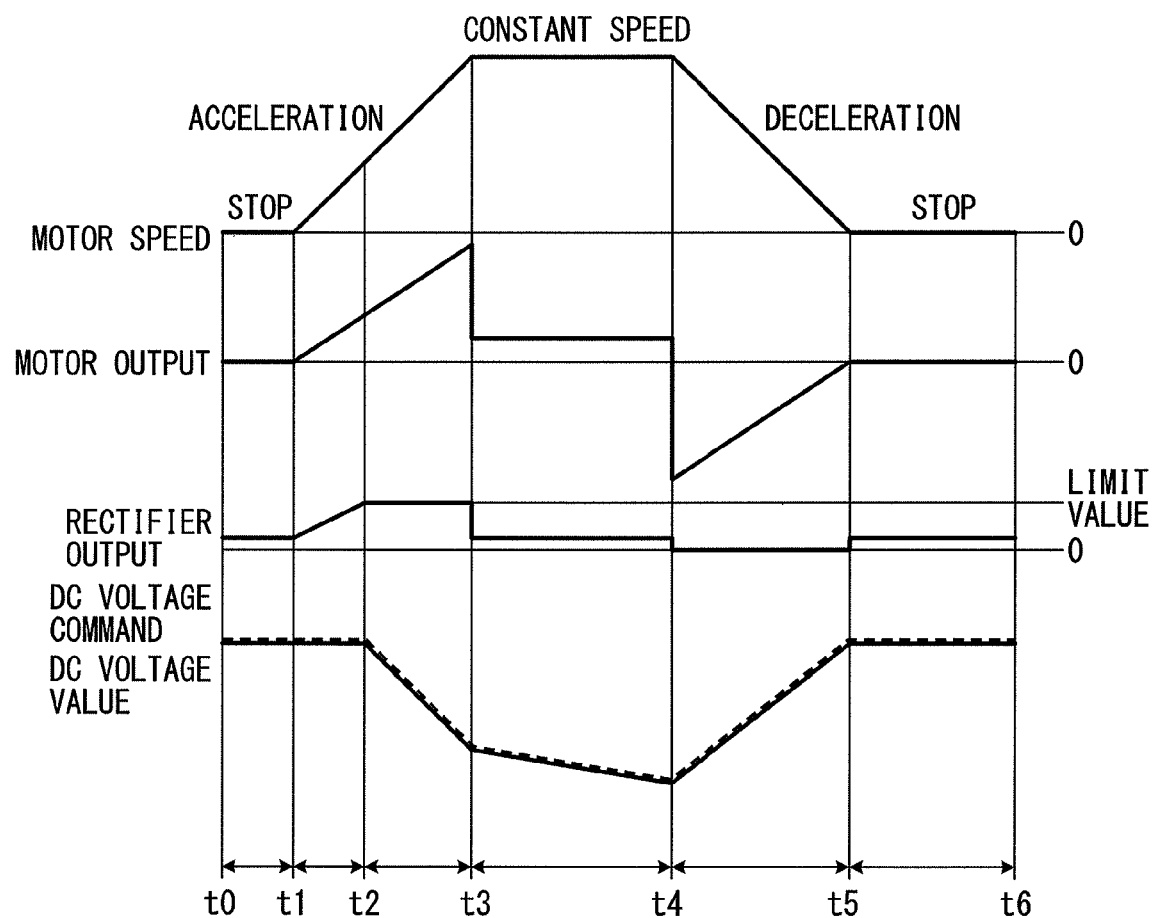
FIG. 14 is a timing chart schematically illustrating an operation of the motor drive unit described in the Japanese Laid-open Patent Publication No. 2012-085512 and the Japanese Laid-open Patent Publication No. 2010-260094.

Note that a DQ coordinate transformation processing is used when generating the PWM control signal, as described with reference to FIG. 11.

The operation state determination unit 56 determines that the main circuit unit 11 is in a power running state when the final current command is positive, and determines that the main circuit unit 11 is in a regenerative state when the final current command is negative.

The PWM operation stopping instruction unit 57 instructs the stop of the switching operation in the main circuit unit 11 when the DC voltage loop saturation determination unit 53 determines the saturation state and the operation state determination unit 56 determines the regenerative state.

Figure 2:
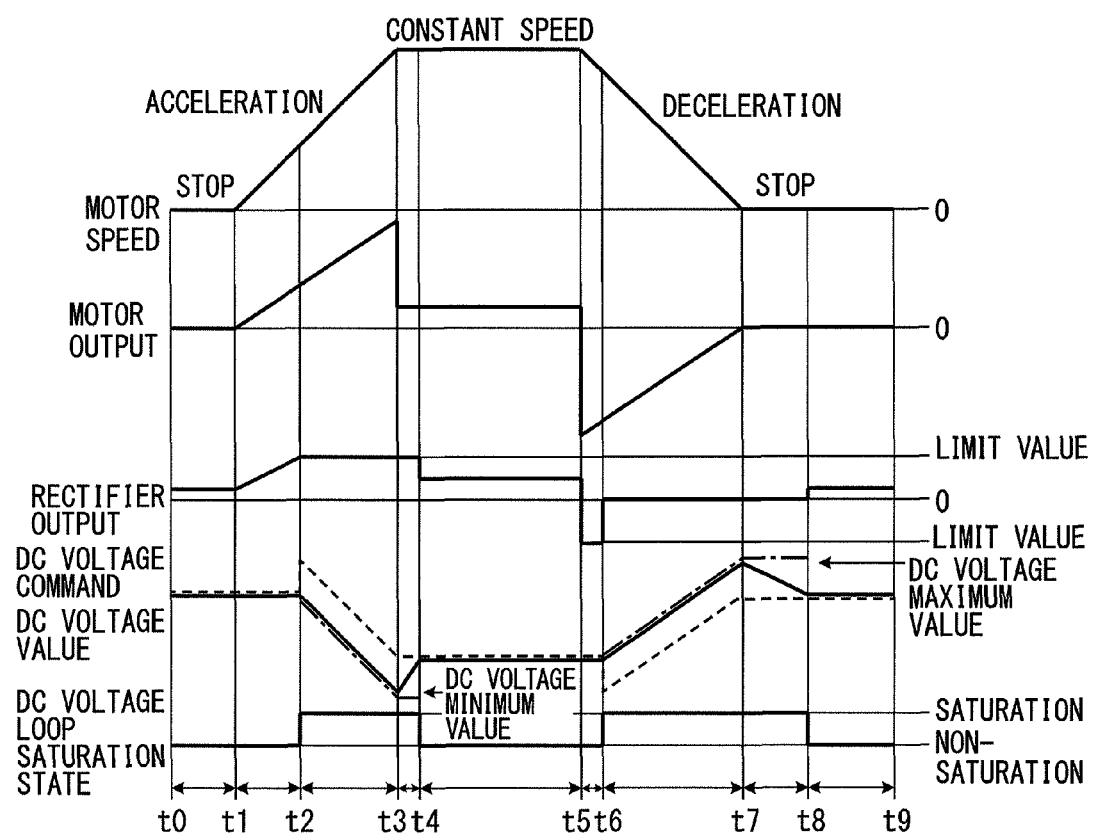
FIG. 2 is a timing chart illustrating an operation of the PWM rectifier illustrated in FIG. 1.
Figure 3:
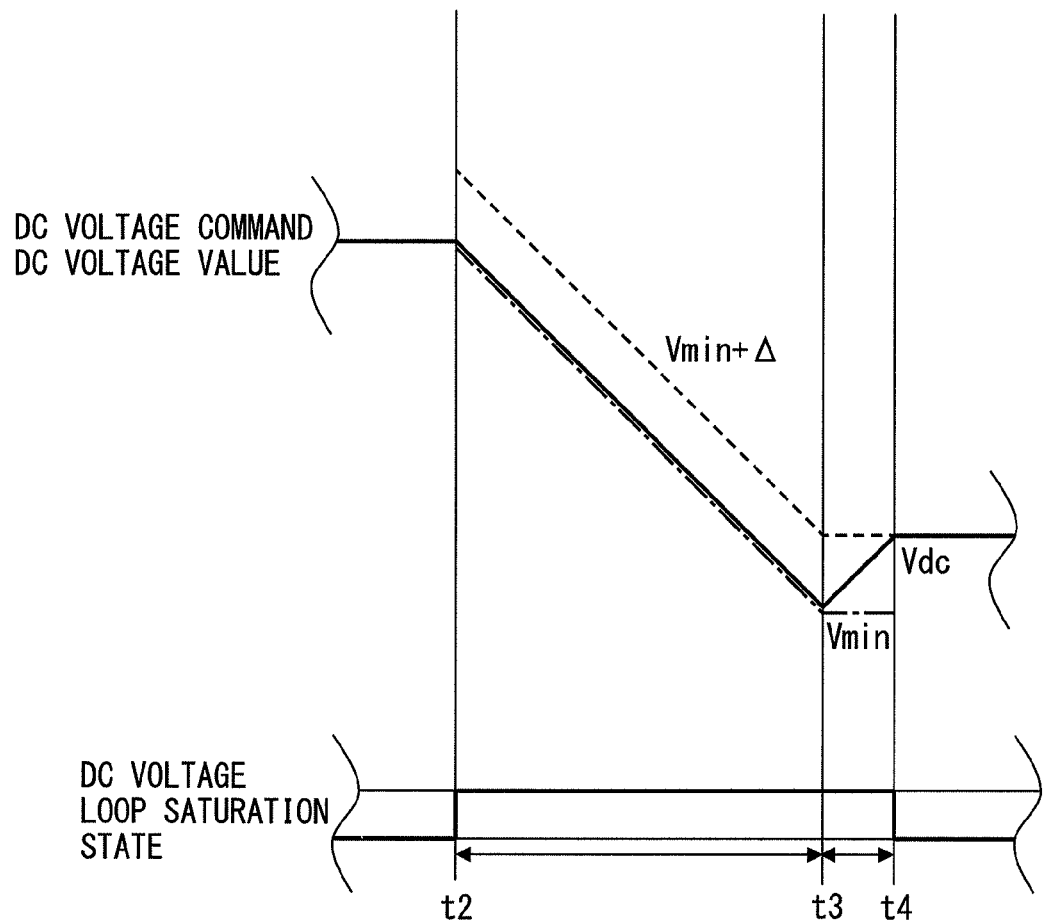
FIG. 3 is a diagram for describing a setting of a DC voltage command by a DC voltage command calculation unit when a DC voltage loop control unit is in a saturation state and a PWM rectifier is in a power running state.
Figure 4:
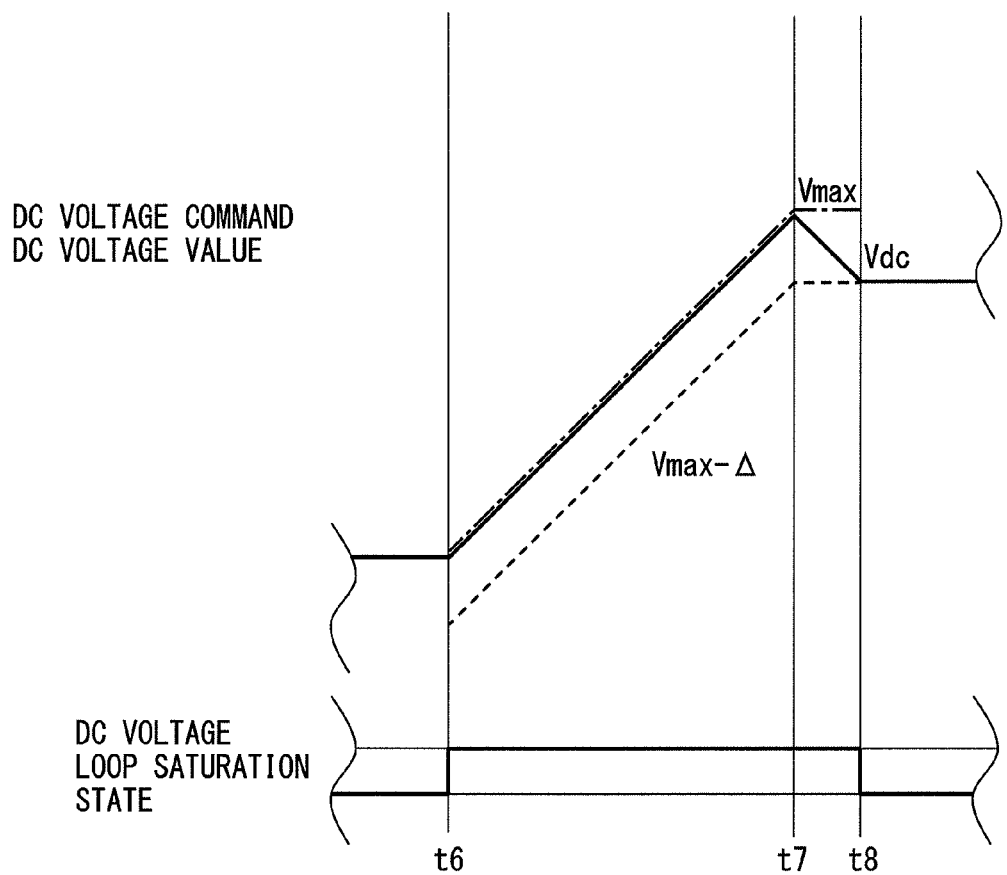
FIG. 4 is a diagram for describing a setting of the DC voltage command by the DC voltage command calculation unit when the DC voltage loop control unit is in the saturation state and the PWM rectifier is in a regenerative state.

Next, an operation of the PWM rectifier illustrated in FIG. 1 will be described with reference to FIG. 2 to FIG. 4. FIG. 2 is a timing chart schematically illustrating an operation of the PWM rectifier illustrated in FIG. 1. FIG. 3 is a diagram for describing a setting of the DC voltage command by the DC voltage command calculation unit when the DC voltage loop control unit is in the saturation state and the PWM rectifier is in the power running state. FIG. 4 is a diagram for describing a setting of the DC voltage command by the DC voltage command calculation unit when the DC voltage loop control unit is in the saturation state and the PWM rectifier is in the regenerative state. Note that FIG. 2 illustrates a "motor speed", a "motor output", a "rectifier output", "DC voltage command and DC voltage value", and "the state of the DC voltage loop control unit" from the top. In each of FIGS. 2 to 4, a dashed line illustrates the DC voltage command and a dashed-dotted line illustrates the minimum or maximum value of the DC voltage value.

In this example, a case will be described in which the motor drive unit 100 including the PWM rectifier 1 according to the first embodiment is operated to cause the motor 3 to stop, accelerate, run at a constant speed, decelerate, and stop in this order.

First, during a motor stop condition from time t0 to time t1, the DC voltage loop control unit 51, the current command control unit 52, and the PWM control signal generation unit 55 of the PWM rectifier 1 controls the DC voltage value of the electric storage device 6 to match the DC voltage command. During this period, the PWM control signal generation unit 55 generates the PWM control signal which causes the power running operation to be performed by the PWM rectifier 1, and outputs the PWM control signal to the main circuit unit 11 so that the DC power for compensating the consumption of energy stored in the electric storage device 6 by the internal resistance of the PWM rectifier 1 or the like is output from the PWM rectifier 1.

When starting acceleration of the motor 3 at time t1, the PWM control signal generation unit 55 generates the PWM control signal which causes the DC output of the PWM rectifier 1 to increase gradually in the power running operation by the PWM rectifier 1, and outputs the PWM control signal to the main circuit unit 11. From time t1 to time t2, since the absolute value of the current command generated by the DC voltage loop control unit 51 does not exceed the predetermined limit value, the current command restriction unit 52 sets the current command generated by the DC voltage loop control unit 51 as the final current command. The PWM control signal generation unit 55 compares the final current command with a triangular-wave carrier signal having a predetermined carrier frequency, and generates the PWM control signal for controlling the switching operation of the switching element in the main circuit unit 11 of the PWM rectifier 1 to output the PWM control signal to the main circuit unit 11. Since the DC voltage value of the electric storage device 6 is controlled to match the DC voltage command, entire energy required for the acceleration of the motor 3 is supplied from the AC power supply 4 side through the power running operation by the PWM rectifier 1 until the time t2. In addition, the operation state determination unit 56 determines that the main circuit unit 11 is in the power running state since the final current command is positive.

After that, when the energy required for the acceleration of the motor 3 reaches a limit value at time t2, the current command restriction unit 52 determines that the absolute value of the current command exceeds a predetermined limit value, and sets the limit value as the final current command.

The PWM control signal generation unit 55 generates the PWM control signal on the basis of the final current command set to the limit value by the current command restriction unit 52, and outputs the PWM control signal to the main circuit unit 11. The DC power output from the main circuit unit 11 is thereby limited to a certain value, but the motor 3 continues to accelerate during this period, and therefore it is less satisfied only with the energy supplied from the AC power supply 4 side through the power running operation of the PWM rectifier 1. Accordingly, the energy supply to the motor 3 from the electric storage device 6 is started. As a result, the DC voltage value (electric potential of the electric storage device 6) detected by the DC voltage detection unit 23 decreases from time t2 to time t3.

Since the current command restriction unit 52 sets the limit value as the final current command after the time t2, the DC voltage loop saturation determination unit 53 determines that "the DC voltage loop control unit 51 is in the saturation state". In addition, since the final current command is positive, the operation state determination unit 56 determines that "the main circuit unit 11 is in the power running state". Accordingly, since the DC voltage loop saturation determination unit 53 determines the saturation state and the operation state determination unit 56 determines the power running state, the DC voltage command calculation unit 54 changes the DC voltage command into a value obtained by adding a predetermined positive offset to a minimum value of the DC voltage value after a transition to the saturation state from the non-saturation state. Now, with reference to FIG. 3, a setting of the DC voltage command by the DC voltage command calculation unit 54 when the DC voltage loop control unit 51 is in the saturation state and the PWM rectifier 1 is in the power running state will be described. FIG. 3 illustrates "the DC voltage command and DC voltage value" and "the state of the DC voltage loop control unit" from around time t2 to around time t4 in FIG. 2.

When the DC voltage loop control unit 51 is in the saturation state and the PWM rectifier 1 is in the power running state due to the acceleration of the motor 3, the DC voltage value (electric potential of the electric storage device 6) detected by the DC voltage detection unit 23 decreases (from time t2 to time t3). In general, the energy required for operating the motor 3 at a constant speed is smaller than the energy required for accelerating the motor 3. Therefore, when completing the acceleration of the motor 3 and starting the constant speed operation (time t3), the motor 3 is driven with the smaller energy than the energy in the acceleration, and whereby the energy which is obtained by excluding the energy used for the constant speed operation of the motor 3 from the energy received from the AC power supply 4 side by the PWM rectifier 1 is stored in the electric storage device 6, and the electric potential of the electric storage device 6 turns to increase. A few time lag is provided between the timing t3 at which the electric potential of the electric storage device 6 starts to increase and the timing t4 at which the determination by the DC voltage loop saturation determination unit 53 is changed to the determination that "the DC voltage loop control unit 51 is in the non-saturation state" from the determination that "the DC voltage loop control unit 51 is in the saturation state". In other words, the value obtained by adding a predetermined positive offset Δ (hereinafter, referred to as the "acceleration completion detection level") to the minimum value Vmin of the DC voltage value after the transition to the saturation state from the non-saturation state is used as the DC voltage command. The acceleration completion detection level Δ is a value corresponding to a hysteresis of the change to the non-saturation state from the saturation state of the DC voltage loop control unit 51, and the value may be set in accordance with the specification of the voltage used for the drive of the motor 3 or the like.

In the illustrated example, the minimum value Vmin is sequentially updated since the DC voltage value decreases gradually from time t2 to time t3, and the value "Vmin+Δ" obtained by adding the acceleration completion detection level Δ thereto is set as the DC voltage command at every update. The DC voltage value takes the minimum value Vmin at time t3 since the acceleration of the motor 3 is completed at time t3, and the value "Vmin+Δ" obtained by adding the acceleration completion detection level Δ to the minimum value Vmin which is the DC voltage value obtained at time t3 is maintained as the DC voltage command from the time t3 to time 4.

Returning to FIG. 2, when the acceleration of the motor 3 is completed and the constant speed operation is started at time t3, the DC voltage value turns to increase as described above, and then the DC voltage value matches the DC voltage command at time t4. The DC voltage loop saturation determination unit 53 determines that the "DC voltage loop control unit 51 is in the non-saturation state" at the time (time t4) when the DC voltage value matches the DC voltage command.

Since the DC voltage value of the electric storage device 6 is controlled to match the DC voltage command during the constant speed operation of the motor 3 from time t4 to time t5, entire energy required for the constant speed operation of the motor 3 is supplied from the AC power supply 4 side through the power running operation by the PWM rectifier 1. During this period, since the current command (final current command) is positive, the operation state determination unit 56 determines that the main circuit unit 11 is in the power running state.

When the motor 3 starts the deceleration at time t5, the regenerative power is generated by the motor 3. The regenerative power is returned to the DC link through the inverter 2, and the DC power resulting from the regenerative power is supplied to the PWM rectifier 1. This means that negative DC power has been output to the DC output side of the PWM rectifier 1. The current command restriction unit 52 determines that the absolute value of the current command exceeds a predetermined limit value, and sets the limit value as the final current command. The PWM control signal generation unit 55 generates the PWM control signal on the basis of the final current command set to the limit value by the current command restriction unit 52, and outputs the PWM control signal to the main circuit unit 11. Thereby, the DC power output from the main circuit unit 11 is limited to a certain value, and the main circuit unit 11 performs the regenerative operation (inverse-conversion operation) in the amount corresponding to the limit value. The operation state determination unit 56 also determines that the main circuit unit 11 is in the regenerative state since the final current command is negative.

From time t5 to time t6, the DC voltage loop saturation determination unit 53 determines that "the DC voltage loop control unit 51 is in the saturation state", since the current command restriction unit 52 sets the limit value as the final current command. In addition, the operation state determination unit 56 determines that "the main circuit unit 11 is in the regenerative state", since the final current command is negative. Therefore, the PWM operation stopping instruction unit 57 instructs the stop of the switching operation in the main circuit unit 11 at time t6. At time t6, since the PWM operation stopping instruction unit 57 outputs a stop command for the switching operation to the main circuit unit 11, the regenerative operation of the PWM rectifier 1 stops, and whereby it becomes impossible to return the DC power resulting from the regenerative power to the AC power supply 4 side. Therefore, storing the DC power to the electric storage device 6 is started, and the DC voltage value (electric potential of the electric storage device 6) detected by the DC voltage detection unit 23 turns to increase.

Since the current command restriction unit 52 sets the limit value as the final current command after the time t6, the DC voltage loop saturation determination unit 53 determines that "the DC voltage loop control unit 51 is in the saturation state". In addition, the operation state determination unit 56 determines that "the main circuit unit 11 is in the regenerative state" since the final current command is negative. Therefore, since it has determined that "the DC voltage loop saturation determination unit 53 is in the saturation state" and that " the main circuit unit 11 is in the regenerative state", the DC voltage command calculation unit 54 changes the DC voltage command into a value obtained by adding a predetermined negative offset to a maximum value of the DC voltage value after the transition to the saturation state from the non-saturation state. Now, with reference to FIG. 4, a setting of the DC voltage command by the DC voltage command calculation unit 54 when the DC voltage loop control unit 51 is in the saturation state and the PWM rectifier 1 is in the regenerative state will be described. FIG. 4 illustrates "the DC voltage command and the DC voltage value" and "the state of the DC voltage loop control unit" from around time t6 to around time t8 in FIG. 2.

When the motor 3 decelerates and the DC voltage loop control unit 51 is in the saturation state and the PWM rectifier 1 is in the regenerative state, the PWM operation stopping instruction unit 57 instructs a stop of the switching operation in the main circuit unit 11 as described above, and therefore the regenerative operation of the PWM rectifier 1 stops, and whereby it becomes impossible to return the DC power resulting from the regenerative power to the AC power supply 4 side. The DC voltage value (electric potential of the electric storage device 6) detected by the DC voltage detection unit 23 increases (from time t6 to time t7). When the deceleration of the motor 3 is completed and the motor 3 stops (time t7), the electric potential of the electric storage device 6 turns to decrease since the regenerative power from the motor 3 is no longer supplied to the DC link through the inverter 2 and the DC power stored in the electric storage device 6 is consumed by the internal resistance of the PWM rectifier 1 or the like. A few time lag is provided between the timing t7 when the electric potential of the electric storage device 6 starts to decrease, and the timing t8 when the determination by the DC voltage loop saturation determination unit 53 is changed to the determination that "the DC voltage loop control unit 51 is in the non-saturation state" from the determination that "the DC voltage loop control unit 51 is in the saturation state". In view of a balance between a prevention of incorrect detecting of the determination by the DC voltage loop saturation determination unit 53 and early detection of the deceleration completion of the motor 3, the value obtained by adding a predetermined negative offset −Δ (hereinafter, referred to as "deceleration completion detection level") to the maximum value Vmax of the DC voltage value after the transition to the saturation state from the non-saturation state is newly used as the DC voltage command instead of the present DC voltage command which has been used. The deceleration completion detection level "−Δ" is a value corresponding to a hysteresis of the change to the non-saturation state from the saturation state of DC voltage loop control unit 51, and the value may be set in accordance with the specification of the voltage used for the drive of the motor 3 or the like.

In the illustrated example, the maximum value Vmax is sequentially updated since the DC voltage value increases gradually from time t6 to time t7, and the value "Vmax−Δ" obtained by adding the deceleration completion detection level "−Δ" thereto is set as the DC voltage command at every update. The DC voltage value takes the maximum value Vmax at time t7 since the deceleration of the motor 3 is completed and the motor 3 stops at time t7, and the value "Vmax−Δ" obtained by adding the deceleration completion detection level "−Δ" to the maximum value Vmax which is the DC voltage value obtained at time t7 is maintained as the DC voltage command from time the t7 to time 8.

Returning to FIG. 2, when the deceleration of the motor 3 is completed and the motor 3 stops at time t7, the DC voltage value turns to decrease since the DC power stored in the electric storage device 6 is consumed by the internal resistance of the PWM rectifier 1 or the like, and then the DC voltage value matches the DC voltage command at time t8. The DC voltage loop saturation determination unit 53 determines that "the DC voltage loop control unit 51 is in the non-saturation state" at the time (time t8) when the DC voltage value matches the DC voltage command.

After the DC voltage value matches the DC voltage command at time t8, the PWM operation stopping instruction unit 57 outputs a cancel command for canceling the stop of the switching operation in the main circuit unit 11 to the main circuit unit 11. The PWM control signal generation unit 55 generates such a PWM control signal so that the power running operation is performed by the PWM rectifier 1, and outputs the PWM control signal to the main circuit unit 11 so that the DC power for compensating the consumption of the energy stored in the electric storage device 6 by the internal resistance of the PWM rectifier 1 or the like is output from the PWM rectifier 1 as in the motor stop condition from time t0 to time t1. Thereby, the DC voltage value is maintained at the DC voltage command.

In this way, according to the first embodiment, setting the above-mentioned limit value used for the processing by the current command restriction unit 52 to such a value that the limit value for the output of the main circuit unit 11 is less than the maximum output of the motor 3 makes it possible to limit the peak of the energy supplied from the PWM rectifier 1 (power supply).

According to the first embodiment, the PWM operation stopping instruction unit 57 outputs the stop command for the switching operation to the main circuit unit 11 when the DC voltage loop saturation determination unit 53 determines the saturation state and the operation state determination unit 56 determines the regenerative state (at time t6 in FIG. 2 and FIG. 4), and this causes the regenerative operation of the PWM rectifier 1 to stop and the DC power resulting from the regenerative power to be stored in the electric storage device 6 without returning the DC power to the AC power supply 4 side. Accordingly, the stored energy can be utilized for an acceleration of the motor 3 at the next time, whereby implementing an efficient operation.

According to the first embodiment, the DC voltage command is set on the basis of the DC voltage value detected by the DC voltage detection unit 23 when the DC voltage loop control unit 51 is in the saturation state, and this can avoid the time and effort for setting a DC voltage command for each operation pattern of a motor by trial and error, which is needed in the invention described in the Japanese Laid-open Patent Publication No. 2012-085512 and the Japanese Laid-open Patent Publication No. 2010-260094, which is efficient.

Figure 5:
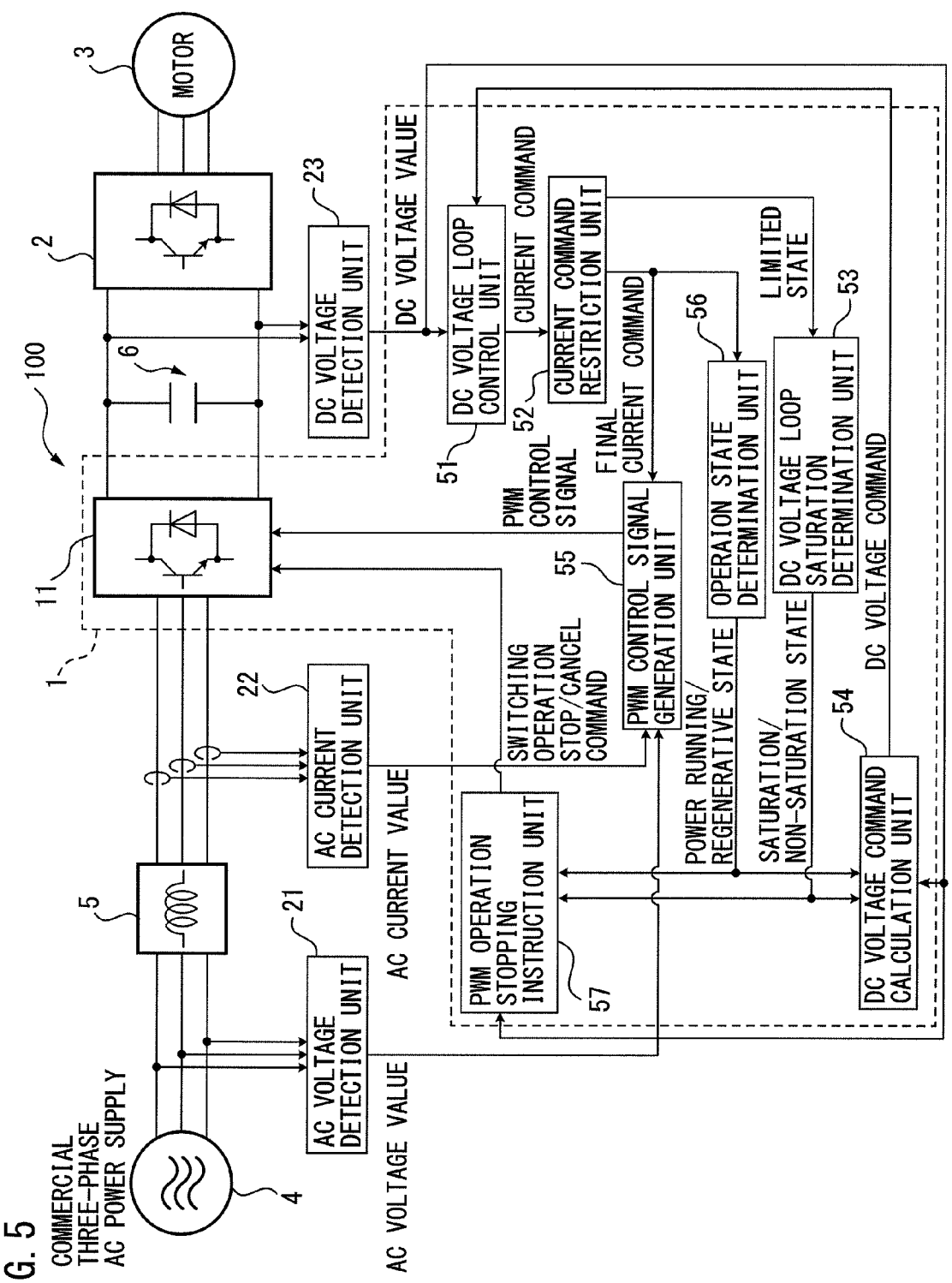
FIG. 5 is a principle block diagram of a PWM rectifier according to a second embodiment.
Figure 6:
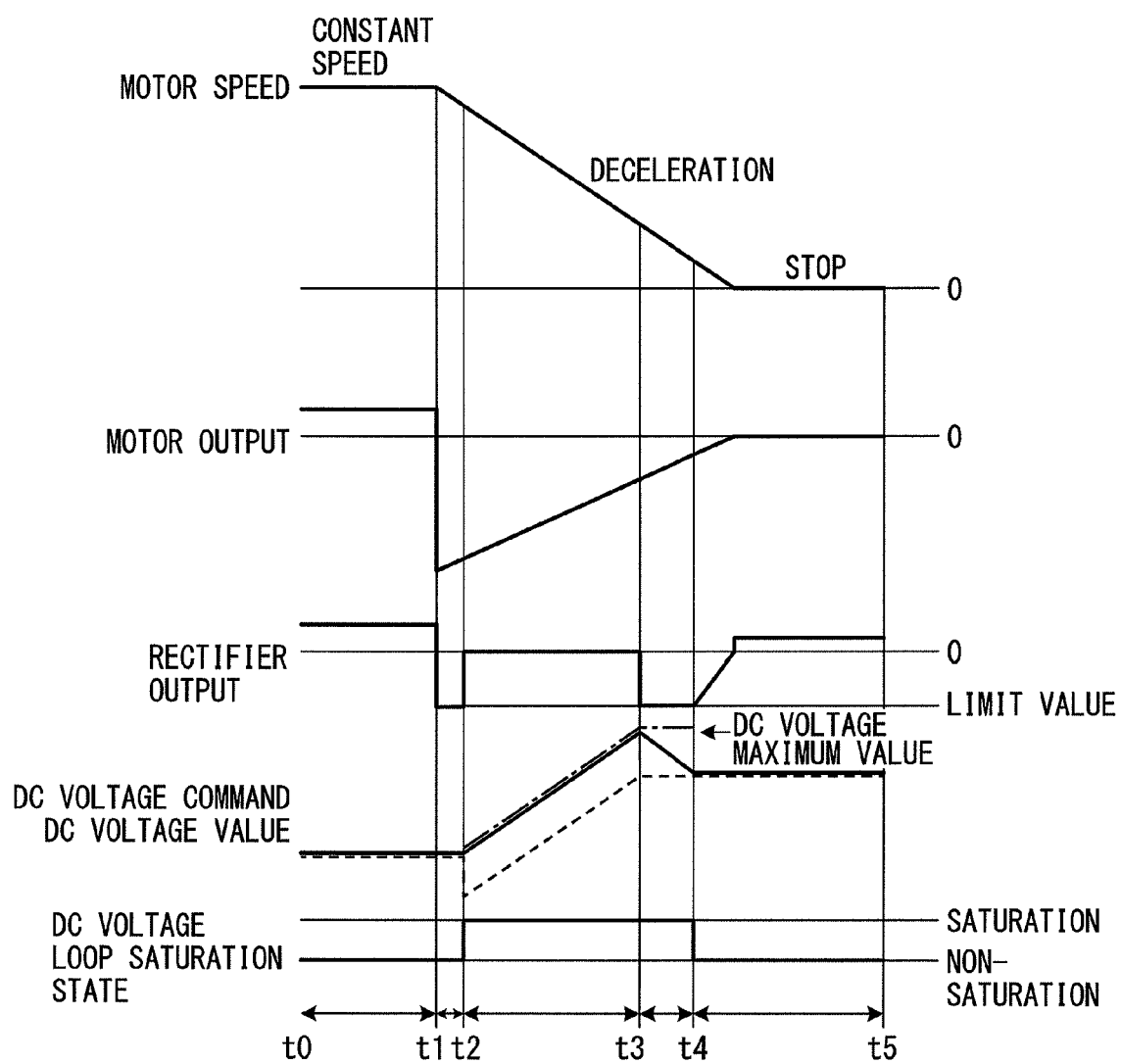
FIG. 6 is a timing chart schematically illustrating an operation of the PWM rectifier illustrated in FIG. 5.

FIG. 5 is a principle block diagram of a PWM rectifier according to a second embodiment. FIG. 6 is a timing chart schematically illustrating an operation of the PWM rectifier illustrated in FIG. 5. Note that FIG. 6 illustrates a "motor speed", a "motor output", a "rectifier output", "DC voltage command and DC voltage value", and "the state of the DC voltage loop control unit" from the top. A dashed line illustrates the DC voltage command and a dashed-dotted line illustrates the minimum or maximum value of the DC voltage value.

The second embodiment further develops the PWM operation stopping instruction unit 57 in the PWM rectifier 1 according to the first embodiment illustrated in FIG. 1. In other words, according to the second embodiment, a PWM operation stopping instruction unit 57 cancels the stop of the switching operation in the main circuit unit 11 when the DC voltage value detected by the DC voltage detection unit 23 exceeds a predetermined value under a condition in which the DC voltage loop saturation determination unit 53 determines the saturation state and the operation state determination unit 56 determines the regenerative state. Therefore, the DC voltage value detected by the DC voltage detection unit 23 is also input into the PWM operation stopping instruction unit 57. It is sufficient for the above-mentioned "predetermined value" used for the comparison with the DC voltage value to be set to a smaller value than a voltage proof corresponding to the capacity of storing electricity of the electric storage device 6. Note that the circuitry elements other than above are substantially the same as the circuitry elements illustrated in FIG. 1. Therefore the same reference numerals are given to the same circuitry elements and the detailed description on the circuitry elements is omitted.

First, in the second embodiment, when the DC voltage loop saturation determination unit 53 determines the saturation state and the operation state determination unit 56 determines the regenerative state, the PWM operation stopping instruction unit 57 outputs the stop command for the switching operation to the main circuit unit 11 to cause the regenerative operation of the PWM rectifier 1 to stop, and to cause the DC power resulting from the regenerative power to be stored in the electric storage device 6 without returning the DC power to the AC power supply 4 side, as in the first embodiment. Furthermore, in the second embodiment, when the DC power resulting from the regenerative power exceeds the capacity of storing electricity of the electric storage device 6, and whereby the electric storage device 6 is no longer able to store the energy, the PWM operation stopping instruction unit 57 outputs a cancel command for canceling the stop of the switching operation in the main circuit unit 11 to the main circuit unit 11 to cause the regenerative operation of the PWM rectifier 1 to resume. According to the second embodiment, the regenerative energy returned from the inverter 2 can be returned to the AC power supply 4 side by operating the PWM operation stopping instruction unit 57 in this way. This makes it possible to avoid a situation in which the energy exceeds a voltage proof of the electric storage device 6.

As an operation example of the PWM operation stopping instruction unit 57 in the second embodiment, a case will be described in which the motor 3 is operated at a constant speed, in deceleration, and to stop in this order as illustrated in FIG. 6. Note that FIG. 6 illustrates a "motor speed", a "motor output", a "rectifier output", "DC voltage command and DC voltage value", and "the state of the DC voltage loop control unit" from the top.

During a constant speed operation of the motor 3 from time t0 to time t1, since the DC voltage value of the electric storage device 6 is controlled to match the DC voltage command as in the case from time t4 to time t5 in the first embodiment, entire energy required for the constant speed operation of the motor 3 is supplied from the AC power supply 4 side through the power running operation by the PWM rectifier 1. In this period, the operation state determination unit 56 determines that the main circuit unit 11 is in the power running state, since the current command (final current command) is positive. In addition, the motor 3 is to be driven with smaller energy than a case of acceleration in the constant speed operation, and therefore the DC output of the PWM rectifier 1 does not exceed a limit value. Therefore, the DC voltage loop saturation determination unit 53 determines that "the DC voltage loop control unit 51 is in the non-saturation state".

When the motor 3 starts deceleration at time t1, the regenerative power is generated by the motor 3 as in the case at time t5 in the first embodiment, and the regenerative power is returned to the DC link through the inverter 2, so that the DC power resulting from the regenerative power is supplied to the PWM rectifier 1. The current command restriction unit 52 determines that it is a case where the absolute value of the current command exceeds a predetermined limit value, and sets the limit value as the final current command. The PWM control signal generation unit 55 generates the PWM control signal on the basis of the final current command set to the limit value by the current command restriction unit 52, and outputs the PWM control signal to the main circuit unit 11. The DC power output from the main circuit unit 11 is thereby limited to a certain value, and the main circuit unit 11 performs the regenerative operation (inverse-conversion operation) with an amount corresponding to the limit value. The operation state determination unit 56 also determines that the main circuit unit 11 is in the regenerative state, since the final current command is negative.

From time t1 to time t2, since the current command restriction unit 52 sets the limit value as the final current command as in the case from time t5 to time t6 in the first embodiment, the DC voltage loop saturation determination unit 53 determines that "the DC voltage loop control unit 51 is in the saturation state". In addition, the operation state determination unit 56 determines that "the main circuit unit 11 is in the regenerative state" since the final current command is negative. Therefore, the PWM operation stopping instruction unit 57 instructs the stop of the switching operation in the main circuit unit 11 at time t2. At time t2, since the PWM operation stopping instruction unit 57 outputs a stop command for the switching operation to the main circuit unit 11, the regenerative operation of the PWM rectifier 1 stops, and whereby it becomes impossible to return the DC power resulting from the regenerative power to the AC power supply 4 side. Therefore, storing the DC power to the electric storage device 6 is started, and the DC voltage value (electric potential of the electric storage device 6) detected by the DC voltage detection unit 23 turns to increase.

After the time t2, since the current command restriction unit 52 sets the limit value as the final current command, the DC voltage loop saturation determination unit 53 determines that "the DC voltage loop control unit 51 is in the saturation state". In addition, the operation state determination unit 56 determines that "the main circuit unit 11 is in the regenerative state" since the final current command is negative. Therefore, since it has been determined that "the DC voltage loop saturation determination unit 53 is in the saturation state" and that "the main circuit unit 11 is in the regenerative state", the DC voltage command calculation unit 54 changes the DC voltage command into a value obtained by adding a predetermined negative offset to a maximum value of the DC voltage value after a transition to the saturation state from the non-saturation state.

When the DC voltage value (electric potential of the electric storage device 6) detected by the DC voltage detection unit 23 exceeds a predetermined value at time t3 by the increase of the DC voltage value detected by the DC voltage detection unit 23, this situation means that the DC power resulting from the regenerative power exceeds the capacity of storing electricity of the electric storage device 6, and the electric storage device 6 is no longer able to store the energy. In this situation, the PWM operation stopping instruction unit 57 outputs a cancel command for canceling the stop of the switching operation in the main circuit unit 11 to the main circuit unit 11 to cause the regenerative operation of the PWM rectifier 1 to resume. When the regenerative operation of the PWM rectifier 1 resumes, the DC voltage command at the resumption time is maintained. A part of regenerative energy returned from the inverter 2 is thereby returned to the AC power supply 4 side, and the DC voltage value (electric potential of the electric storage device 6) detected by the DC voltage detection unit 23 decreases. The regenerative operation of the PWM rectifier 1 is executed until the DC voltage value detected by the DC voltage detection unit 23 matches the DC voltage command (at time t4).

When the DC voltage value matches the DC voltage command at time t4, the DC voltage loop saturation determination unit 53 determines that "the DC voltage loop control unit 51 becomes in the non-saturation state". After that, the PWM operation stopping instruction unit 57 outputs the cancel command for canceling the stop of the switching operation in the main circuit unit 11 to the main circuit unit 11. The PWM control signal generation unit 55 generates such a PWM control signal that the power running operation is performed by the PWM rectifier 1, and outputs the PWM control signal to the main circuit unit 11 so that the DC power for compensating the consumption of the energy stored in the electric storage device 6 by the internal resistance of the PWM rectifier 1 or the like is output from the PWM rectifier 1. Thereby, the DC voltage value is maintained at the DC voltage command.

In this way, according to the second embodiment, when the regenerative energy generated by the deceleration of the motor 3 exceeds the capacity of storing electricity of the electric storage device 6, and whereby the electric storage device 6 is no longer able to charge the energy, the PWM operation stopping instruction unit 57 outputs a cancel command for canceling the stop of the switching operation in the main circuit unit 11 to the main circuit unit 11 to cause the regenerative operation of the PWM rectifier 1 to resume, and therefore the regenerative energy returned from the inverter 2 can be returned to the AC power supply 4 side. This makes it possible to avoid a situation in which the energy exceeds a voltage proof of the electric storage device 6.

Figure 7:
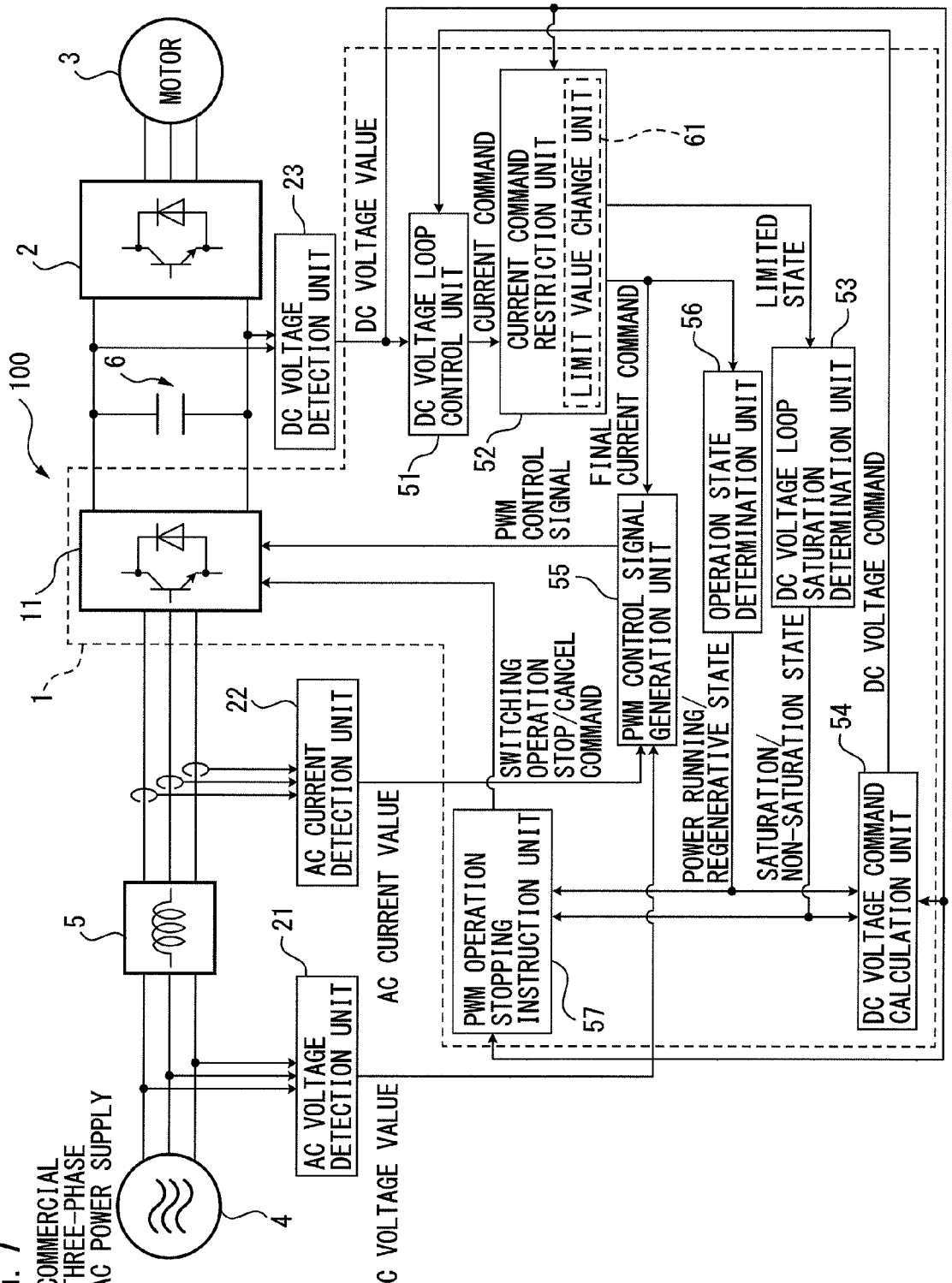
FIG. 7 is a principle block diagram of a PWM rectifier according to a third embodiment.
Figure 8:
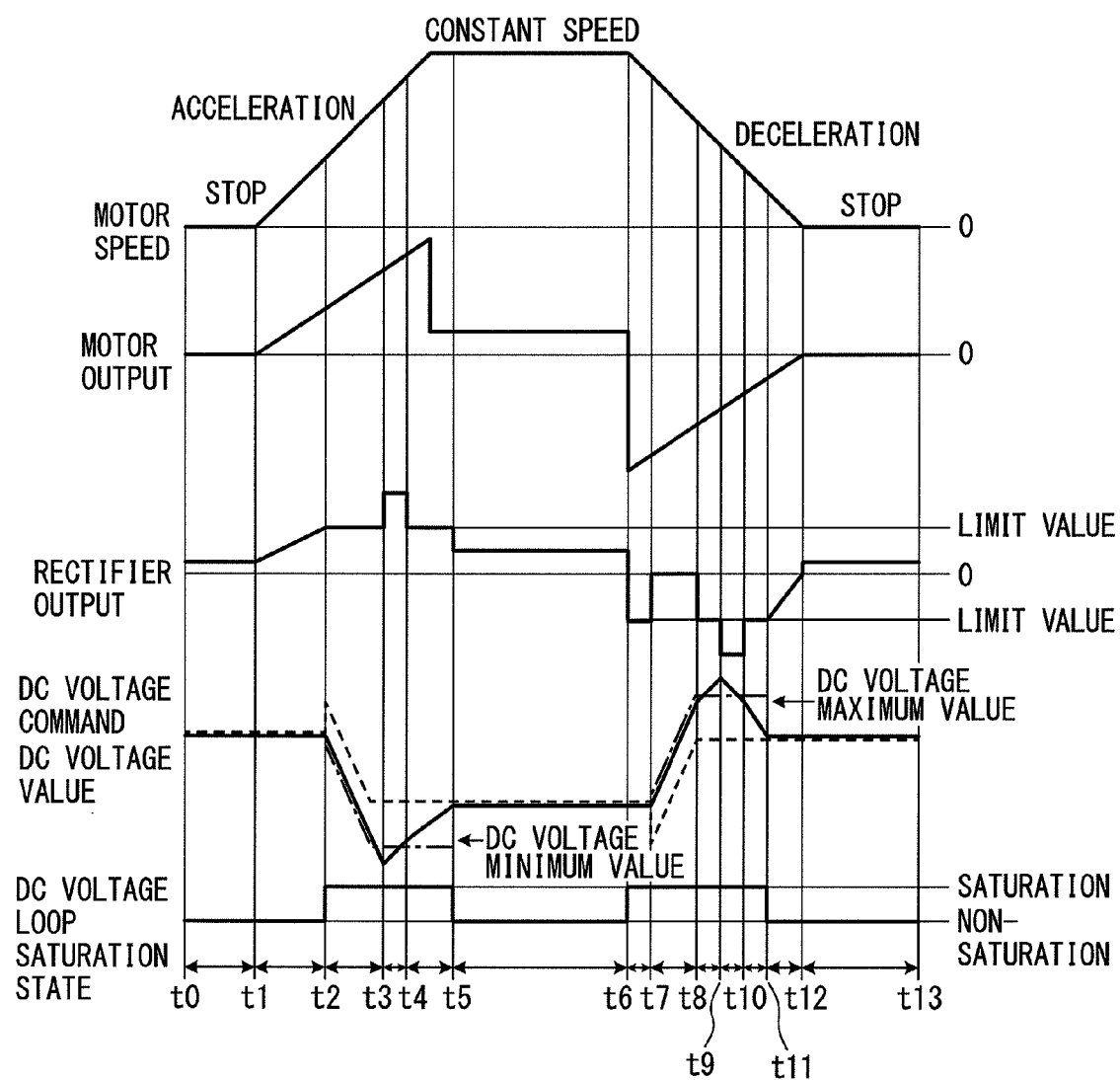
FIG. 8 is a timing chart schematically illustrating an operation of the PWM rectifier illustrated in FIG. 7.

FIG. 7 is a principle block diagram of a PWM rectifier according to a third embodiment. FIG. 8 is a timing chart schematically illustrating an operation of the PWM rectifier illustrated in FIG. 7. Note that FIG. 8 illustrates a "motor speed", a "motor output", a "rectifier output", "DC voltage command and DC voltage value", and "the state of the DC voltage loop control unit" from the top. A dashed line illustrates the DC voltage command and a dashed-dotted line illustrates the minimum or maximum value of the DC voltage value.

The third embodiment further develops the current command restriction unit 52 in the PWM rectifier 1 according to the first embodiment illustrated in FIG. 1, or the current command restriction unit 52 in the PWM rectifier 1 according to the second embodiment illustrated in FIG. 5. Note that FIG. 7 illustrates a case in which a limit value change unit 61 is provided in the current command restriction unit 52 in the PWM rectifier 1 according to the second embodiment illustrated in FIG. 5.

The third embodiment changes a limit value originally set into a larger value to fall the DC voltage value (electric potential of the electric storage device 6) within a normal range, when the DC voltage value (electric potential of the electric storage device 6) decreases more than expected at the time of acceleration of the motor 3 or when the DC voltage value (electric potential of the electric storage device 6) increases more than expected at the time of deceleration of the motor 3.

According to the third embodiment, a current command restriction unit 52 includes a limit value change unit 61 which changes a limit value into a larger limit value when the DC voltage value detected by the DC voltage detection unit 23 exceeds a first threshold value or falls below a second threshold value smaller than the first threshold value, and which returns the limit value to the value before the change mentioned above when the DC voltage value detected by the DC voltage detection unit 23 falls within a range between the first threshold value and the second threshold value after changing the limit value into the "larger limit value". Therefore, although the DC voltage value detected by the DC voltage detection unit 23 is also input into the limit value change unit 61 in the current command restriction unit 52, the DC voltage value to be used for the change processing of the DC voltage command by the DC voltage command calculation unit 54 is held at at the first threshold value on the upper side and is held at at the second threshold value on the lower side. In other words, in the third embodiment, as for the DC voltage command, the first threshold value serves as the upper limit value and the second threshold value serves as the lower limit value. The circuitry elements other than above are substantially the same as the circuitry elements illustrated in FIG. 5. Therefore, the same reference numerals are given to the same circuitry elements and the detailed description on the circuitry elements is omitted.

As an operation example of the limit value change unit 61 in the current command restriction unit 52 in the third embodiment, a case will be described in which the motor 3 is caused to stop, accelerate, run at a constant speed, decelerate, and stop in this order as illustrated in FIG. 8. Note that FIG. 8 illustrates a "motor speed", a "motor output", a "rectifier output", "DC voltage command and DC voltage value", and "the state of the DC voltage loop control unit" from the top.

The operation from time t0 to time t3 is substantially the same as the operation from time t0 to time t3 in the first embodiment, and therefore the description thereon is omitted. Especially from time t2 to time t3, as in the case from time t2 to time t3 in the first embodiment, since the DC voltage loop saturation determination unit 53 has determined the saturation state and the operation state determination unit 56 has determined the power running state, the DC voltage command calculation unit 54 changes the DC voltage command into a value "Vmin+Δ" obtained by adding a predetermined positive offset (acceleration completion detection level Δ) to a minimum value Vmin of the DC voltage value after a transition to the saturation state from the non-saturation state.

When the DC voltage value (electric potential of the electric storage device 6) detected by the DC voltage detection unit 23 falls below the second threshold value by the acceleration of the motor 3 at time t3, the limit value change unit 61 in the current command restriction unit 52 newly sets the limit value, instead of the limit value originally set, to a larger limit value than the limit value originally set. The current command restriction unit 52 uses the above-mentioned new limit value for comparison with the absolute value of the current command generated by the DC voltage loop control unit 51.

After the time t3, the value obtained by adding the acceleration completion detection level Δ to the DC voltage value Vmin at time t3 is used as the DC voltage command.

In this way, canceling the limit value originally set and setting the above-mentioned new and larger limit value (time t3) causes the PWM rectifier 1 to further receive the energy from the AC power supply 4 side to provide the energy to the DC link. As a result, the energy is stored in the electric storage device 6, and the DC voltage value (electric potential of the electric storage device 6) detected by the DC voltage detection unit 23 turns to increase.

When the DC voltage value (electric potential of the electric storage device 6) detected by the DC voltage detection unit 23 has returned to the second threshold value as a result of the increase (time t4), the current command restriction unit 52 returns the limit value to the above-mentioned limit value originally set.

The operation from time t4 to time t9 is substantially the same as the operation from time t3 to time t7 in the first embodiment, and therefore the description thereon is omitted.

When the DC voltage value (electric potential of the electric storage device 6) detected by the DC voltage detection unit 23 exceeds the first threshold value due to the deceleration of the motor 3 at time t9, the limit value change unit 61 in the current command restriction unit 52 newly sets the limit value, instead of the limit value originally set, to a larger limit value than the limit value originally set. The current command restriction unit 52 uses the above-mentioned new limit value for comparison with the absolute value of the current command generated by the DC voltage loop control unit 51.

After the time t9, the value obtained by adding the deceleration completion detection level "−Δ" to the DC voltage value Vmax at time t9 is used as the DC voltage command.

In this way, canceling the limit value originally set and setting the above-mentioned new and larger limit value (time t9) causes the PWM rectifier 1 to further return (regenerate) the energy from the DC link to the AC power supply 4 side. As a result, the energy in the electric storage device 6 is discharged, and the DC voltage value (electric potential of the electric storage device 6) detected by the DC voltage detection unit 23 decreases.

When the DC voltage value (electric potential of the electric storage device 6) detected by the DC voltage detection unit 23 has returned to the first threshold value as a result of the decrease (time t10), the current command restriction unit 52 returns the limit value to the above-mentioned limit value originally set.

The operation from time t10 to time t13 is substantially the same as the operation from time t3 to time t5 in the second embodiment, and therefore the description thereon is omitted.

In this way, according to the third embodiment, it is possible to fall the DC voltage value (electric potential of the electric storage device 6) within a normal range since the limit value originally set is changed into a larger value, when the DC voltage value (electric potential of the electric storage device 6) decreases more than expected at the time of acceleration of the motor 3 or when the DC voltage value (electric potential of the electric storage device 6) increases more than expected at the time of deceleration of the motor 3.

Figure 9:
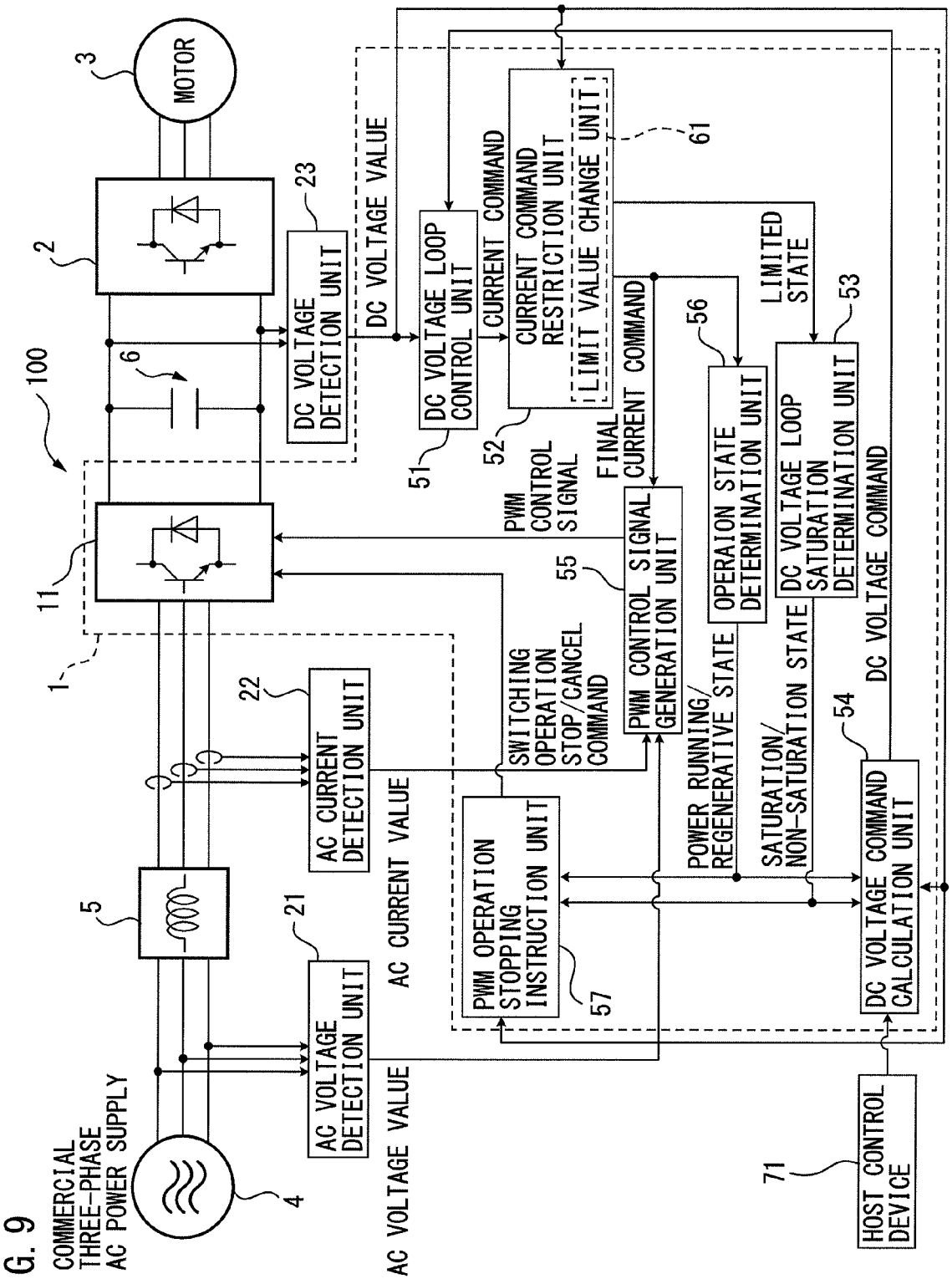
FIG. 9 is a principle block diagram of a PWM rectifier according to a fourth embodiment.
Figure 10:
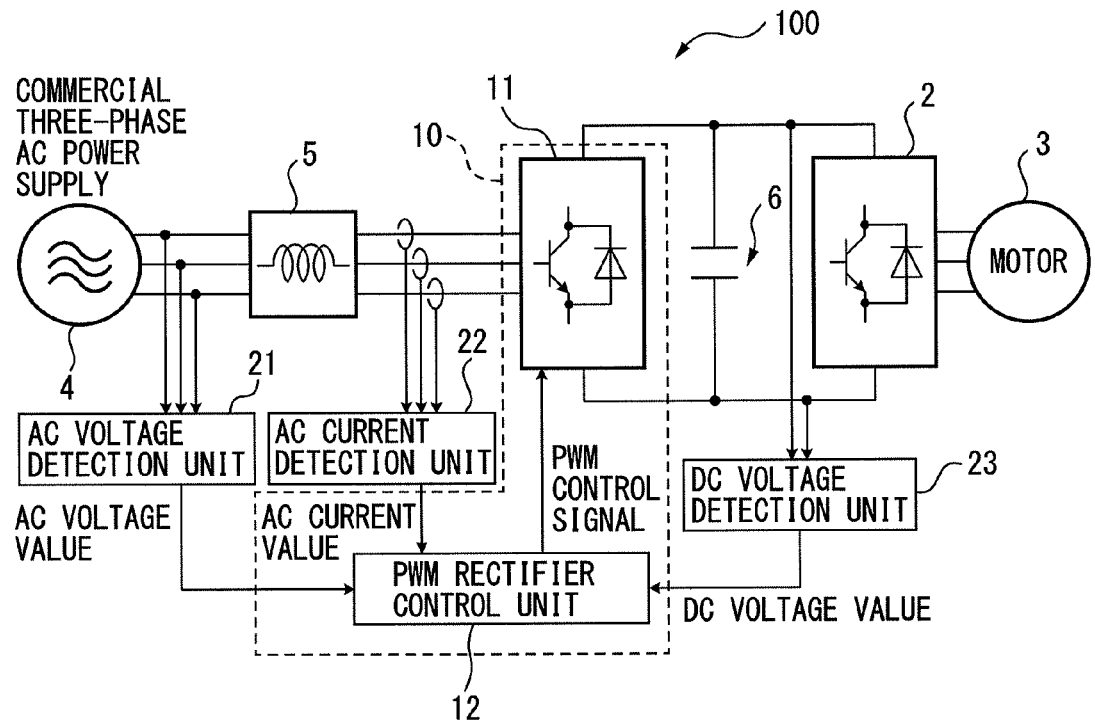
FIG. 10 is a diagram illustrating a configuration of a common motor drive unit.

FIG. 9 is a principle block diagram of a PWM rectifier according to a fourth embodiment. The fourth embodiment further develops the above-mentioned first embodiment, second embodiment, or third embodiment. Note that FIG. 9 illustrates a case in which a host control device 71 is connected to the DC voltage command calculation unit 54 according to the third embodiment illustrated in FIG. 7.

The DC voltage command calculation unit 54 resets the DC voltage command, which has been changed when the DC voltage loop saturation determination unit 53 has determined the saturation state, into the DC voltage command before the change in response to an initialization command input from the host control device 71. The DC voltage command before the change is set to a value greater than a continuous rating value of components which constitute the PWM rectifier 1 and smaller than a short-time rating value. This allows the possible electric potential in the electric storage device 6 to fall within a range of the voltage proof of the components which constitute the PWM rectifier 1, and therefore the capacity of the electric storage device 6 can be reduced.

According to the present invention, it is possible to implement a PWM rectifier for a motor drive which can suppress an electric power peak which occurs at the time of acceleration and deceleration of a motor and reduce a power supply capacity on the AC power supply side.

According to the first embodiment, setting the limit value to such a value that the limit value for the output of the main circuit unit in the PWM rectifier is less than the maximum output of the motor makes it possible to limit the peak of the energy supplied from the PWM rectifier (power supply). In addition, the regenerative operation of the PWM rectifier is caused to stop and the DC power resulting from the regenerative power from the motor is caused to be stored in the electric storage device without returning the DC power to the commercial three-phase AC power supply side when the DC voltage loop saturation determination unit determines the saturation state and the operation state determination unit determines the regenerative state. The stored energy is utilized for an acceleration of a motor at the next time. Therefore, an efficient operation can be implemented and a power supply capacity can be significantly reduced compared to the conventional example.

According to the first embodiment, the DC voltage command is set on the basis of the DC voltage value detected by the DC voltage detection unit when the DC voltage loop control unit is in the saturation state, and this can avoid the time and effort for setting a DC voltage command for each operation pattern of a motor by trial and error, which is needed in the inventions described in the Japanese Laid-open Patent Publication No. 2012-085512 and the Japanese Laid-open Patent Publication No. 2010-260094, which is efficient.

According to the second embodiment, when the regenerative energy generated by the deceleration of the motor exceeds the capacity of storing electricity of the electric storage device, and whereby the electric storage device is no longer able to charge the energy, the regenerative operation of the PWM rectifier is caused to resume, and therefore an effect that a situation in which the energy exceeds a voltage proof of the electric storage device can be avoided is further achieved in addition to the above-mentioned effects in the first embodiment.

According to the third embodiment, when the DC voltage value (electric potential of the electric storage device) decreases more than expected at the time of acceleration of the motor or the DC voltage value (electric potential of the electric storage device) increases more than expected at the time of deceleration of the motor, the limit value originally set is changed into a larger value, and therefore an effect that the DC voltage value (electric potential of the electric storage device 6) can be fallen within a normal range is further achieved in addition to the above-mentioned effects in the first and second embodiments.

According to the fourth embodiment, the DC voltage command which has been changed when the DC voltage loop saturation determination unit has determined the saturation state is reset to the DC voltage command before the change in response to an initialization command input from a host control device, and this allows the possible electric potential in the electric storage device to fall within the range of the voltage proof of the components which constitute the PWM rectifier. Therefore, an effect that the capacity of the electric storage device can be made small is further achieved in addition to the above-mentioned effects in the first to third embodiments.

What is claimed is:

1. A PWM rectifier connected through an electric storage device capable of storing DC power to DC side of an inverter performing a power conversion between the DC power and AC power which is drive power or regenerative power of a motor, the PWM rectifier comprising:
    a main circuit unit in which a switching operation of a switching element is PWM-controlled on the basis of a PWM control signal received, and which performs a power conversion between AC power on an AC power supply side and the DC power on the DC side;
    a DC voltage loop control unit which generates a current command to cause the DC voltage value on the DC side of the main circuit unit to match a DC voltage command received;
    a current command restriction unit which sets, when an absolute value of the current command exceeds a limit value predetermined, the limit value as a final current command, and otherwise sets the current command as the final current command;
    a DC voltage loop saturation determination unit which determines that the DC voltage loop control unit is in a saturation state when the current command restriction unit sets the limit value as the final current command and otherwise determines that the DC voltage loop control unit is in a non-saturation state;
    a DC voltage command calculation unit which maintains the DC voltage command when the DC voltage loop saturation determination unit determines the non-saturation state, and changes the DC voltage command into a value obtained by adding a predetermined offset to a minimum value or a maximum value of the DC voltage value after a transition to the saturation state from the non-saturation state when the DC voltage loop saturation determination unit determines the saturation state; and
    a PWM control signal generation unit which generates the PWM control signal using the final current command to output the PWM control signal to the main circuit unit.

2. The PWM rectifier according to claim 1 further comprising:
    an operation state determination unit which determines that the main circuit unit is in a power running state when the final current command is positive, and that the main circuit unit is in a regenerative state when the final current command is negative,
    wherein the DC voltage command calculation unit changes the DC voltage command into the value obtained by adding a predetermined positive offset to the minimum value of the DC voltage value after the transition to the saturation state from the non-saturation state when the DC voltage loop saturation determination unit determines the saturation state and the operation state determination unit determines the power running state.

3. The PWM rectifier according to claim 2 further comprising:
    an operation state determination unit which determines that the main circuit unit is in a power running state when the final current command is positive, and that the main circuit unit is in a regenerative state when the final current command is negative; and
    a PWM operation stopping instruction unit which instructs a stop of the switching operation in the main circuit unit when the DC voltage loop saturation determination unit determines the saturation state and the operation state determination unit determines the regenerative state,
    wherein the DC voltage command calculation unit changes the DC voltage command into the value obtained by adding a predetermined negative offset to the maximum value of the DC voltage value after the transition to the saturation state from the non-saturation state when the DC voltage loop saturation determination unit determines the saturation state and the operation state determination unit determines the regenerative state.

4. The PWM rectifier according to claim 3 wherein, under a condition in which the DC voltage loop saturation determination unit determines the saturation state and the operation state determination unit determines the regenerative state, the PWM operation stopping instruction unit cancels the stop of the switching operation in the main circuit unit when the DC voltage value exceeds a predetermined value.

5. The PWM rectifier according to claim 4 wherein
    the current command restriction unit comprises a limit value change unit which changes the limit value into a larger limit value when the DC voltage value exceeds a first threshold value or falls below a second threshold value smaller than the first threshold value, and which sets the limit value back to the limit value before the change when the DC voltage value falls within a range between the first threshold value and the second threshold value after changing into the larger limit value.

6. The PWM rectifier according to claim 1 wherein
    the DC voltage command calculation unit sets the DC voltage command changed when the DC voltage loop saturation determination unit has determined the saturation state back to the DC voltage command before the change in response to an initialization command input from a host control device.

7. The PWM rectifier according to claim 6 wherein
the DC voltage command before the change is set as a value larger than a continuous rating value of components which constitute the PWM rectifier and smaller than a short-time rating value.

8. The PWM rectifier according to claim 5 wherein
the DC voltage command calculation unit includes an extracting unit which extracts the minimum value and the maximum value of the DC voltage value after the transition to the saturation state from the non-saturation state.

* * * * *